US011637687B2

(12) United States Patent
Smith et al.

(10) Patent No.: US 11,637,687 B2
(45) Date of Patent: Apr. 25, 2023

(54) METHODS AND APPARATUS TO DETERMINE PROVENANCE FOR DATA SUPPLY CHAINS

(71) Applicant: Intel Corporation, Santa Clara, CA (US)

(72) Inventors: Ned Smith, Beaverton, OR (US); Francesc Guim Bernat, Barcelona (ES); Sanjay Bakshi, Portland, OR (US); Paul O'Neill, Bray (IE); Ben McCahill, Greystones (IE); Brian A. Keating, East Park Shannon (IE); Adrian Hoban, Limerick (IE); Kapil Sood, Portland, OR (US); Mona Vij, Hillsboro, OR (US); Nilesh Jain, Portland, OR (US); Rajesh Poornachandran, Portland, OR (US); Trevor Cooper, Portland, OR (US); Kshitij A. Doshi, Tempe, AZ (US); Marcin Spoczynski, Leilip (IE)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 16/723,743

(22) Filed: Dec. 20, 2019

(65) Prior Publication Data

US 2020/0136799 A1 Apr. 30, 2020

(51) Int. Cl.
*H04L 29/06* (2006.01)
*H04L 9/00* (2022.01)
(Continued)

(52) U.S. Cl.
CPC ............ *H04L 9/008* (2013.01); *G06F 16/282* (2019.01); *G06F 16/289* (2019.01); *H04L 9/0643* (2013.01); *H04L 9/50* (2022.05)

(58) Field of Classification Search
CPC ................. G06F 21/62; G06F 21/6209; G06F 21/6218; G06F 21/6227; G06F 21/64;
(Continued)

(56) References Cited

U.S. PATENT DOCUMENTS 9,800,911 B2 10/2017 Smith et al.
2013/0167192 A1* 6/2013 Hickman ............ G06F 21/6245
726/1
(Continued)

OTHER PUBLICATIONS

Bits On Blocks, "A Gentle Introduction to Self-Sovereign Identity", retrieved from https://bitsonblocks.net/2017/05/17/gentle-introduction-self-sovereign-identity/ on Mar. 16, 2020, 19 pages.
(Continued)

*Primary Examiner* — Malcolm Cribbs
(74) *Attorney, Agent, or Firm* — Hanley, Flight & Zimmerman, LLC

(57) ABSTRACT

Methods, apparatus, systems and articles of manufacture to determine provenance for data supply chains are disclosed. Example instructions cause a machine to at least, in response to data being generated, generate a local data object and object metadata corresponding to the data; hash the local data object; generate a hash of a label of the local data object; generate a hierarchical data structure for the data including the hash of the local data object and the hash of the label of the local data object; generate a data supply chain object including the hierarchical data structure; and transmit the data and the data supply chain object to a device that requested access to the data.

25 Claims, 14 Drawing Sheets

(51) Int. Cl.
*G06F 16/28* (2019.01)
*H04L 9/06* (2006.01)

(58) Field of Classification Search
CPC .... G06F 16/1824; G06F 21/44; G06F 21/629;
G06F 16/2379; G06F 16/9027; G06F
16/289; G06F 16/282; H04L 9/0643;
H04L 9/30; H04L 2209/38; H04L 9/0637;
H04L 9/0618; H04L 9/3247; H04L
9/3239; H04L 9/3263; H04L 2209/56;
H04L 9/0656; H04L 9/008; G06Q 20/06;
G06Q 20/382; G06Q 20/401; G06Q
2220/00; G06Q 20/381; G06Q 40/04;
G06Q 20/3825; G06Q 20/3827; G06K
9/00577; G06K 2009/00583
See application file for complete search history.

(56) References Cited

U.S. PATENT DOCUMENTS

| | | | | |
|---|---|---|---|---|
| 2019/0260592 | A1* | 8/2019 | Nguyen | ........... G06Q 10/06316 |
| 2019/0363874 | A1* | 11/2019 | Shirley | ................ H04L 9/3239 |
| 2021/0019326 | A1* | 1/2021 | Rauch | ................ G06F 16/9027 |

OTHER PUBLICATIONS

Microsoft, "Dice: Device Identifier Composition Engine", retrieved from https://www.microsoft.com/en-us/research/project/dice-device-identifier-composition-engine/, established Jan. 1, 2015, 8 pages.

Wikipedia, "Homomorphic Encryption", retrieved from https://en.wikipedia.org/wiki/Homomorphic_encryption on Mar. 16, 2020, last edited on Feb. 12, 2020, 10 pages.

Windley, Phillip, "How Blockchain Makes Self-Sovereign Identities Possible", Computer World, published on Jan. 10, 2018, 9 pages.

Kishore, Shashwat, "PySEAL: Homomorphic Encryption in a User-Friendly Python Package", retrieved from https://gab41.lab41.org/pyseal-homomorphic-encryption-in-a-user-friendly-python-package-e27547a0b62f, Apr. 23, 2018, 4 pages.

Elias, Andrew, "Understanding Hardware Roots of Trust", retrieved from https://www.synopsys.com/designware-ip/technical-bulletin/understanding-hardware-roots-of-trust-2017q4.html on Mar. 16, 2020, 10 pages.

Rouse, Margaret, "What is Self-Sovereign Identity? Definition from WhatIs.com", retrieved from https://searchsecurity.techtarget.com/definition/self-sovereign-identity on Dec. 20, 2019, last updated May 2019, 6 pages.

Moren et al., "An Information Model for Firmware Updates in IoT Devices draft-ietf-suit-information-model-04," SUIT, Internet Draft, Oct. 30, 2019, 45 pages.

Wikipedia, "Git," The Wayback Machine, retrieved from "https://en.wikipedia.org/w/index.php?title=Git&oldid=930337715" last edited on Dec. 11, 2019, 19 pages.

Wikipedia, "ISO/IEC 19770," The Wayback Machine, retrieved from "https://en.wikipedia.org/w/index.php?title=ISO/IEC_19770&oldid=925029044" last edited on Nov. 7, 2019, 13 pages.

Wikipedia, "Resource fork," The Wayback Machine, retrieved from "https://en.wikipedia.org/w/index.php?title=Resource_fork&oldid=927377371" last edited on Nov. 22, 2019, 10 pages.

* cited by examiner

METHODS AND APPARATUS TO DETERMINE PROVENANCE FOR DATA SUPPLY CHAINS

FIELD OF THE DISCLOSURE

This disclosure relates generally to data processing, and, more particularly, to methods and apparatus to determine provenance for data supply chains.

BACKGROUND

A blockchain is a list of blocks or records that are linked using cryptography. Each block in a blockchain may include a hash of previous blocks, a timestamp, and transaction data. A blockchain may be managed by a peer-to-peer network that adheres to a protocol for internode communication and validation of new blocks into the chain. A blockchain provides a decentralized, distributed and often public digital ledger to record transactions across many computers.

Figure 1:
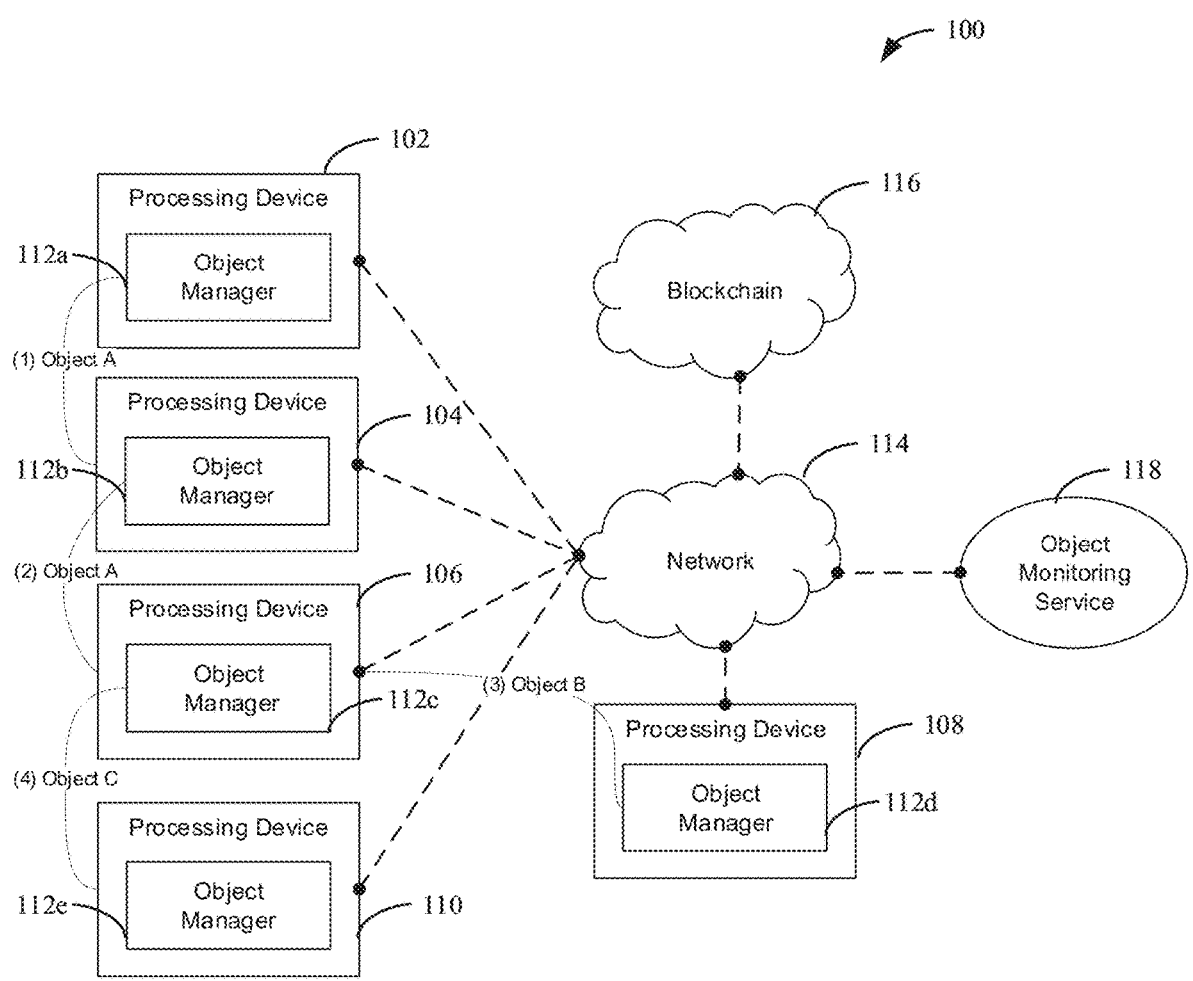
FIG. 1 illustrates an example system architecture including a group of data supply chain devices participating in a data supply chain in accordance with teachings of this disclosure.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Data supply chains correspond to the lifecycle of data. An example data supply chain for media data (also referred to as media) is as follows. When media is created, the initially created media may be adjusted by an author, editor, etc. various times until final media is created. For example, a musician may create an audio file and a sound engineer may adjust the audio file (e.g., by mixing, mastering, and/or otherwise adjusting one or more volumes, audio spectrums, pitches, etc.) to create a final audio file that may be released as a song. Further, once the song is released, disc jockeys may further adjust the audio song to create new songs, mix with other music, etc. At each stage, the audio is adjusted and/or manipulated.

Data lifecycles in edge computing environments address several challenges including (A) non-linear evolution of authors/artists of media, (B) distributed evolution, (C) integration with tools that bridge user interface and enhance creativity, productivity of quality, (D) efficient handing of large sets of data, projects, or archives, (E) integrity of intermediate and final works, (F) authenticity of intermediate and final works (e.g., works can be associated with its rightful artist), (G) licensing, copyright, use and other legally binding considerations that may be applied to data, digital creations, digital representations of analog creations, etc., (H) strategies for combining, merging, modifying data, creations, or works when multiple changes apply to the same data, creation or work, and/or (I) keeping historically accurate record of changes to data or inferences created from data regardless of ecosystem, participant, and/or stakeholder changes. Examples disclosed herein integrate change control management techniques into edge compute services and edge data pools, edge information-centric networks (ICN) and edge data serialization for video, multi-media, structured data, metadata, software update files, user productivity files, etc. As used herein, edge or edge computing is a distributed computing network that brings computation and/or data storage closer to the location where the computation and/or data storage is needed relative to a centralized cloud computing architecture (e.g., closer to an end device relative to the centralized cloud computing architecture).

Examples disclosed herein link data (e.g., media, audio, video, text, etc.) with a data supply chain (DSC) object. In some examples disclosed herein, the DSC object is a data structure that traces evolution, ownership, disclosure, and/or use of the data that the object is linked to. An example DSC object disclosed herein enables integration of such tracing into an open ledger like Blockchain and/or any other distributed mechanism. In some disclosed examples, the DSC object facilitates declarative management of transmissions over data and metadata. Examples disclosed herein include creating a DSC object that creates and updates change management metadata corresponding to the DSC data object. Examples disclosed herein further include using a blockchain to trace and/or record data provenance (e.g., inputs, entities, systems, processes, etc., that influence the data linked to the DSC object) to enforce and/or audit data protection through a data supply chain. A blockchain is a list of record (e.g., blocks) that are linked using cryptography, where each block may include a cryptographic hash of the previous block, a timestamp, and transaction data (e.g., a Merkle tree). A Merkle tree is a tree that may include leaf nodes that are labeled with a hash of a data block and non-leaf nodes labelled with the cryptographic hashes of the labels of their child nodes.

Examples disclosed herein further include building tools into a DSC data object for managing changes and/or exploring the provenance of inferencing results taken from edge data streams. In this manner, as the media is passed from device to device, each device and/or a separate object monitoring service device can manipulate the media using the tools and/or can obtain the building tools to analyze the history of the data. Examples disclosed herein further include applying data serialization formats that support cryptographic operations to provide security to the DSC objects. Examples disclosed herein further allow for performance of data mashups (e.g., data merges) that result in new compositions that can be tracked through a data supply chain.

Using the example DSC objects disclosed herein allows artists and/or content creators to be able to keep track of their intellectual property rights in a distributed and decentralized data ecosystem. In some examples, the use of the DSC objects disclosed herein allows media owners to independently audit inferences generated by AI-driven entities. Some examples disclosed herein do not require a centralized control authority in which members must participate, thereby resulting in a flexible governance model that can be customized to local or municipal needs.

FIG. 1 illustrates an example system architecture 100 including a group of DSC devices participating in a data supply chain. The example system architecture 100 includes example processing devices 102, 104, 106, 108, 110, an example object managers 112a-e, an example network 114, example blockchain services 116, and an example object monitoring service 118. Although the example system architecture 100 includes five processing devices, the system architecture 100 could include any number of processing devices.

The example processing devices 102, 104, 105, 108, 110 of FIG. 1 are computing devices that generate, receive, and/or modify data (e.g., a media file). The example processing devices 102, 104, 106, 108, 110 may be end user devices, smart devices, edge devices, servers, and/or any other type of computing device. In the example of FIG. 1, the example processing devices 102 and 108 act as DSC object creation devices, the example devices 104 and 110 act as DSC object consumption devices and the example processing device 106 acts as a DSC object aggregating device, as further described below. However, any of the example processing devices 102, 104, 106, 108, 110 can operate as creation devices, consumption devices, and/or aggregator devices. For example, the example processing device 102 may act as a creation device at a first time and act as a consumption and/or aggregator device at a second time. A creation device is a device that creates data linked to DSC object, a consumption device is a device that receives, modifies, and/or views or otherwise interacts with and/or consumes data linked to a DSC object, and an aggregator device is a device that aggregates two or more DSC objects into a single DSC object that includes data from the two or more DSC objects. The example processing devices 102, 104, 106, 108, 110 may transmit the data and/or corresponding DSC object to other devices in the system 100 via the example network 114. The example processing devices 102, 104, 106, 108, 110 include the example object managers 112a-e.

The example object managers 112a-c of FIG. 1 are hardware and/or software (e.g., an application, a driver, etc.) implemented by the example processing devices 102-110, respectfully. The example object managers 112a-c generate a DSC object for generated data and/or modifies the DSC object when the data is accessed, modified, viewed, deleted, etc. For example, when the processing device 102 generates new data (e.g., an edge device creating new data and/or a user creating media at the processing device 102), the object managers 112a-e generate a DSC object to be linked to the new data. In this manner, when a requesting device (e.g., another processing device 104-110) requests the data, the object manager 112a of the transmitting device transmits (e.g., via a wired or wireless connection) the data with the corresponding DSC object. When the requesting device accesses, edits, etc. the received data, the requesting device updates the corresponding DSC object to reflect the access, edits, etc. In the illustrated example, the DSC object created by one or more of the managers 112a-e includes a local Merkle Tree, local data objects (e.g., working files corresponding to the data), object metadata, a revisions log, and a local commit log, as further described below in conjunction with FIG. 3A. The DSC object acts as a record of the use and/or modification of the data throughout its life cycle. In the illustrated example, when the processing device 104 obtains data linked to a DSC object (e.g., to view the data and/or to modify the data), the object managers 112a-e modify the linked DSC object corresponding to the actions taken (e.g., viewing, modifying, etc.) on the data. For example, the object generator managers 112a-e may modify the DSC object to track views of the corresponding data for digital rights management purposes (e.g., tracking and/or paying for data consumed and recorded). In some examples, the object managers 112a-e may aggregate one or more DSC objects into a new DSC object that combines information of the one or more DSC objects. For example, the processing device 106 may receive a first DSC object (corresponding to Object A in FIG. 1) associated with first data from the example processing device 104 (e.g., via network 114) and receive a second DSC object (corresponding to Object B in FIG. 1) associated with second data from the example processing device 108 (e.g., via network 114). In such an example, the object manager 112c of the example processing device 106 may aggregate (e.g., combine) information from Object A and/or some or all of the first data and/or Object B and/or some or all of the second data to generate a third DSC object (corresponding to Object C in FIG. 1). In this manner, Object A is linked to the first data, Object B is linked to the second data, and Object C is linked (e.g., corresponding to a generational dependency) to third data corresponding to a combination/aggregation of the first and second data. For example, the delta between Object A and Object C links the two object. In some examples, Object A may disappear once Object B is instantiated. However, a log, history, metadata, etc. remains that vouches for the existence of Object A. In some examples, a first version of a data in a DSC (Object C1) can be shared and/or cloned with multiple other DSC objects that makes changes to C1 (e.g. C1', C1", C1'" etc. . . . ). In such examples, the changes are merged back to C1 to produce C2 that corresponds to a sum or aggregate of the changes. In some examples, one or more of the object managers 112a-e create a trusted layer component (e.g., root of trust) to instantiate a modular portable data pool. In this manner, a DSC object can be secured. For example, the DSC object can be put under portable data pool control, the DSC object can be encrypted and/or attested to a peer node using an attestation protocol. The example object manager 112a is further described below in conjunction with FIG. 2.

The example network 114 of FIG. 1 is a system of interconnected systems exchanging data. The example network 114 may be implemented using any type of public or private network such as, but not limited to, the Internet, a telephone network, a local area network (LAN), a cable network, a cloud-based network, a wired network, and/or a wireless network. To enable communication via the network 114, the example processing devices 102, 104, 106, 108, 110 may include a communication interface that enables a connection to an Ethernet, a digital subscriber line (DSL), a telephone line, a coaxial cable, a wired connection, a wireless connection, etc., or any combination thereof.

The example blockchain 116 of FIG. 1 is a decentralized object change management network that enforces data provenance for data linked to DSC objects as the data is consumed and/or modified. The example blockchain 116 of FIG. 1 uses smart contracts (e.g., a protocol to digitally facilitate, verify, and/or enforce a contract corresponding to data linked to DSC objects). However, other protocols may be used to enforce contracts and/or otherwise manage the lifespan of data linked with DSC objects. The example blockchain 116 records revisions to data linked to a DSC objects in a local log as the starting point of a next evolution of the data and/or corresponding DSC object that may subsequently be applied. For example, if the processing device 102 generates data linked to a new DSC object and the processing device 102 establishes a connection to the example network 114, the example block chain miners of the blockchain 116 can recognize the presence of the DSC Object and, using a distributed consensus algorithm, agree regarding the DSC Objects name, local data objects, object metadata, revisions and a commit file. The DSC object may be associated with cryptographic key(s) that protect integrity, confidentiality and the DSC object identifying in the system 100. In some examples, if the data linked to an DSC object corresponds to digital rights management, the example blockchain 116 records viewing and/or modification of the data and/or payment for data consumption. In some examples, the blockchain 116 issues certificates to the example processing devices 102, 104, 106, 108, 110 to generate proxy identities.

The example object monitoring service 118 of FIG. 1 is a centralized object change management device (e.g., one or more servers, processors, etc.) that tracks, monitors, and/or enforces data provenance and integrity for data and/or the underlying infrastructure linked to DSC objects as the data is consumed and/or modified in a similar manner as the blockchain 116. The example object monitoring service 118 records revisions to data linked to a DSC objects in a local log as the starting point of a next evolution of the data and/or corresponding DSC object that may subsequently be applied. For example, if the processing device 102 generates data linked to a new DSC object and the processing device 102 establishes a connection to the example network 114, the object monitoring service 118 can recognize the presence of the DSC Object and, using a distributed consensus algorithm, agree regarding the DSC Objects name, local data objects, object metadata, revisions and a commit file. The DSC object may be associated with cryptographic key(s) that protect integrity, confidentiality and the DSC object identifying in the system 100. In some examples, if the data linked to an DSC object corresponds to digital rights management, the object monitoring service 118 can record viewing and/or modification of the data and/or payment for data consumption. In some examples, the object monitoring service 118 issues certificates to the example processing devices 102, 104, 106, 108, 110 to generate proxy identities. Additionally, the example object monitoring service 118 can monitor updates to the blockchain 116. For example, the object monitoring server 188 may identify "fair use," "licensed" and "unlicensed" use of media resulting in some appropriate compensating transactions (e.g., reporting fair use, collecting royalties for licensed use or notifying law enforcement for unlicensed use). Additionally or alternatively, the object monitoring server 118 may employ an ERM workflow to control sensitive content access using an access control service (e.g., Open Authorization (OAuth2), Security Assertion Markup Language (SAML), eXtensible Access Control Markup Language (XACML), Radius, etc.). Although the example system architecture 100 includes an example blockchain 116 and an example object monitoring service 118 to track data and corresponding DSC object, the example system architecture 100 may only include one of the blockchain 116 or the object monitoring service 118 to track data and corresponding DSC objects.

Figure 2:
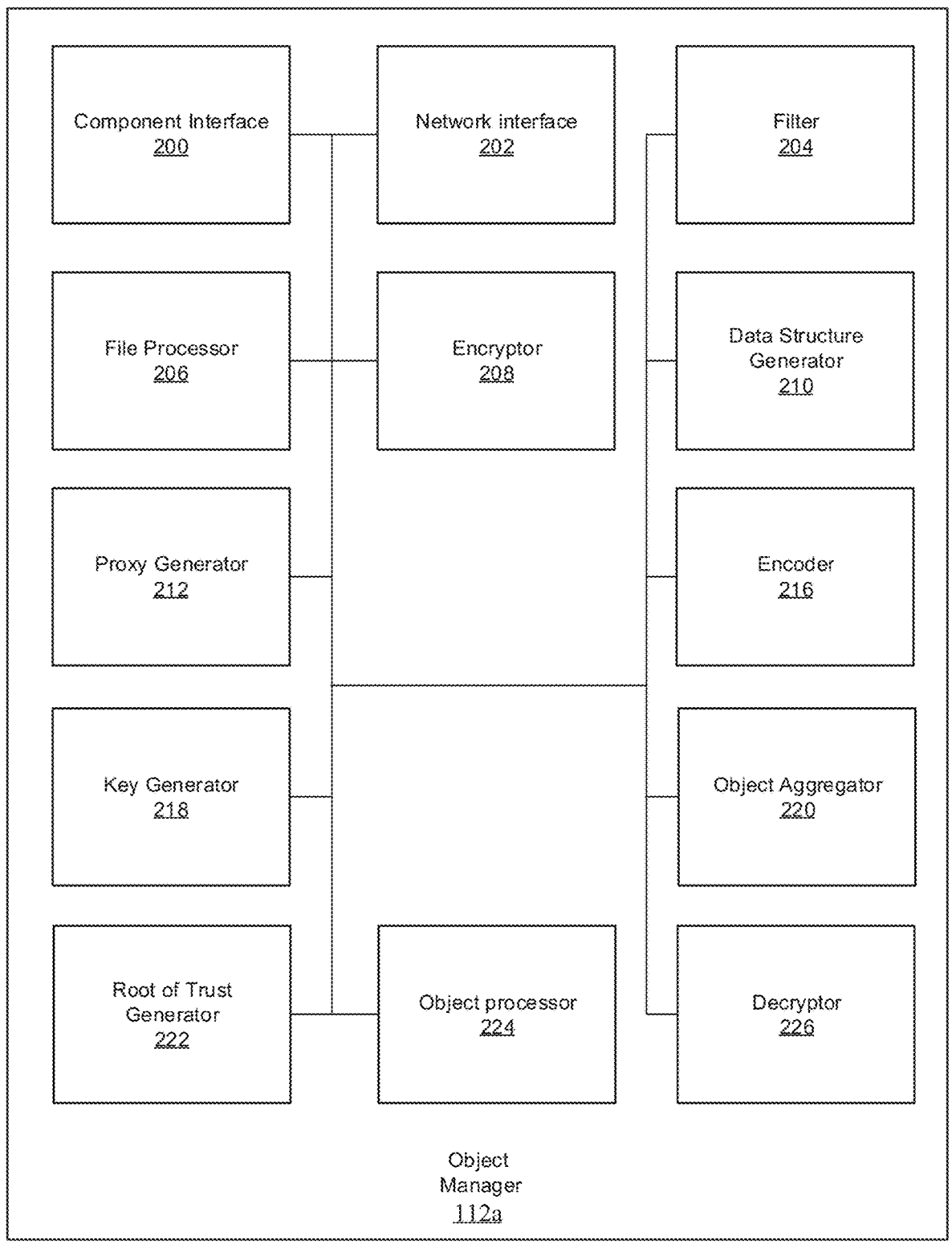
FIG. 2 is a block diagram of an example implementation of an object manager included in the system architecture of FIG. 1.

FIG. 2 is block diagram of an example implementation of the object manager 112a of FIG. 1. The example object manager 112a of FIG. 2 may be used to implement one or more of the object managers 112a-e of FIG. 1. The example object manager 112a of FIG. 2 includes an example component interface 200, an example network interface 202, an example filter 204, an example file processor 206, an example encryptor 208, an example data structure generator 210, an example proxy generator 212, an example encoder 216, an example key generator 218, an example object aggregator 220, an example root of trust generator 222, an example object processor 224, and an example decryptor 226.

The example component interface 200 of FIG. 2 interfaces with components of the example processing device 102, 104, 106, 108, 110 to obtain data stored in, received by, and/or used by the example processing device 102, 104, 106, 108, 110. For example, the component interface 200 may access and/or modify files (e.g., media and/or data that has been generated, received, viewed, etc.), data corresponding to the files, metadata, certificates, roots of trust, etc.

The example network interface 202 of FIG. 2 access the example network 114 to transmit (e.g., via a wired or wireless connection) DSC data objects to any one of the example processing devices 102, 104, 106, 108, 110, the example blockchain 116, and/or the example object monitoring service 118. Additionally, the example network interface 202 may receive/transmit (e.g., via a wired or wireless connection) digest values, attestation requests, signed data, vouchers, and/or certificates from any one of the example processing devices 102, 104, 106, 108, 110, the example blockchain 116, and/or the example object monitoring service 118.

The example filter 204 of FIG. 2 filters obtained data (e.g., media, data files, etc.). For example, if the object manager 112a is implemented in an IOT device, the obtained data may be a high volume of machine generated data and/or data corresponding to machine operation (e.g., performance, reliability, power, noise telemetry, etc.). Accordingly, the example filter 204 may filter the high volume of obtained data into a fraction of the data that will be retained for long term use. In such an example, the remaining fraction may be stored for a short duration for any problem exploration or qualification before being discarded. The example filter 204 may filter the obtained data based on user and/or manufacturer preference regarding how to filter and/or how much to filter.

The example file processor 206 of FIG. 2 processes received data files to identify information corresponding to the file for purposes of DSC object creation. For example, the file processor 206 may determine whether the data file include sensitive data (e.g., if the data was flagged as sensitive), whether the DSC object is controlled using self-sovereign identity (SSI), whether a file corresponds to a particular format or structure, the type of encryption to use, whether the data should be limited to particular device(s) based on user and/or manufacturer preferences, etc. SSI is an identity management system where the user manages the elements that make up the identity and controls access to the credentials digitally. An object may be controlled using self-sovereign identity based on user and/or manufacturer preferences.

The example encryptor 208 of FIG. 2 encrypts a DSC object. In some examples, the encryptor 208 performs a homomorphic encryption. Homographic encryption is a form or encryption that allows computation on encrypted ciphertext data to generate an encrypted result which, when decrypted, matches the result of the operations as if they had been performed on the unencrypted plaintext data. For example, additive homomorphic encryption may be used in conjunction with privacy protecting counters used for tracking purposes (e.g., to track accesses to data while protecting the values of the data). The example encryptor 208 may also utilize homomorphic encryption when aggregating DSC objects without direct disclosure of content to the entity performing the aggregation. Additionally or alternatively, the example encryptor 208 may encrypt a DSC object using data protection keys. For example, the encryptor 208 may encrypt a DSC object with an archival class key stored on hard disc drive (HDD), solid state drive (SSD), tape, etc. of the processing device. Additionally or alternatively, the example encryptor 208 may encrypt a DSC object with an in-memory encryption key (e.g., multi-key total memory encryption (MKTME), INTEL™ software guard extension (SGX), INTEL™ trusted domain extensions (TDX), or with a user's own key using INTEL™ quick assist technology (QAT), INTEL™ key protection technology (KPT), and/or another form of cryptographic accelerator or key manager. Additionally or alternatively, integrity protection may be performed with a message authentication coding (MACing) key for in memory storage or isolation in a secure execution environment (e.g., root of trust, a virtual machine hypervisor, enclave, co-processor, FPGA design, graphic processor, microcontroller, peripheral device, etc.). In some examples, the encryptor 208 may hash local data objects and/or generate a cryptographic hash of labels of the local data object. A local data object is a unit of data (e.g. a data block, a blob, a file, a segment, a transaction record, etc.) corresponding to a new file.

The example data structure generator 210 of FIG. 2 generates the DSC data object. For example, when a new file is generated, the example data structure generator 210 generates a local data object and object metadata corresponding to the new file. The local data object corresponds to the working files corresponding to the file. The local data object may include file version numbers, grants of access to the file, records of access to the file, and revision made to either. Additionally, the example data structure generator 210 generates a hierarchical data structure (e.g., local Merkle tree) for a new file corresponding to a hash of the local data object as a leaf node and a cryptographic hash of the level of the local data object as the intermediate level nodes of the hierarchical data structure. In some examples, the data structure generator 210 may generate a local commit log to track versions for the new file. When the file is updated, the example data structure generator 210 can update the local commit log to identify the different versions of the new file that have been generated. In some examples, the data structure generator 210 generates a revision(s) log to track the revision(s) of the new file. When the file is updated, the example data structure generator 210 can update the revisions log to identify the revisions that were performed on the new file. In some examples, the data structure generator 210 packages the hierarchical data structure, local data objects, object metadata, revision log, and/or local commit log into a local DSC object that can be linked to the new file. In some examples, the data structure generator 210 may include tools in the DSC object for accessing and/or manipulating the data file linked to the DSC object or the DSC object itself.

The example proxy generator 212 of FIG. 2 establish a proxy identity using a certificate for a self-sovereign identity, thereby allowing individuals and/or entities to have ownership of their identifies and control over how their data is shared and/or used. In this manner, the identify holder can reveal only the necessary data for any given transaction or interaction. A blockchain participant may provide the certificates that the example proxy generator 212 uses to establish the proxy identity. The proxy identity, secured with the certificate, may protect elements identified and not obscured for access rights that correspond to the protected elements (e.g., a digital identifier that reveals and authorizes access to one's own medical records, or medical records associated with proxy identities registered as patients under one's care). DSC objects having self-sovereign identity to identify the self-contained DSC objects means that the object is also self-sovereign.

The example encoder 216 of FIG. 2 encodes the DSC object. Data files correspond to different data encoding formats. For example, audio files are encoded as MP3, M4A, etc. Accordingly, if the data file corresponds to a particular encoding format, the example encoder 216 encodes the DSC object to match the encoding of the data file. The example encryptor 208 may further serialize content specific encodings (e.g., using cryptographic serialization) for secure conveyance between processing devices (e.g., using COSE, JOSE, CMW, CIVIL signing, etc.). In some examples, the encoder 216 may encode some data for secure distribution. For example, the example encoder 216 may use data manipulation language (e.g., CDDL, JSON, XML, CBOR, ASN.1) to allow interoperability because the serialization technique is known by both encoders and decoders.

The example key generator 218 of FIG. 2 generates vouchers and/or data storage keys. For example, the key generator 218 may generate a voucher for limiting access to a file to particular devices. The key generator 218 generates a voucher to include the public key and/or trust anchor of another device in the system architecture 100 of FIG. 1. The voucher establishes which peer nodes are authorized to import the DSC object into their storage systems. The key generator 218 may generate the vouchers to also include a key wrapping key (e.g., RSA public keys for trusted entities). Vouchers may security link to a PDP and/or other related data object. For example, a DSC object may identify edge hosting resources where data are physically located, replicated, cached, etc. Any movement, reference counting increment/decrement and/or access grant may be gated by the root of trust that interprets the voucher. In some examples, the key generator 218 may generate data storage keys use to authenticate and/or attest a data pool.

The example object aggregator 220 of FIG. 2 aggregates data from two or more DSC objects into a new DSC object corresponding to the two DSC objects. The object aggregator 220 may also generate and sign (e.g., for tracking and/or auditing) any data that is derived from child subtrees under a DSC object. Such data may include information that can be used to recreate a set of transformations, apply the set of transformations, and/or verify the net result of the transformations to produce a verifiable result over the data. For example, a component of the system 100 may record the operational lineage of a file with where the transformations of the file were performed, a timestamp, and signatures over the intermediate data. In such an example, even though the intermediate data may be transient and lost, the intermediate data may be recovered by performing the document transformations and verified against the signatures. This allows the example object aggregator 220 to debug, inspect, and/or generate greater confidence in the robustness of the data supply chain. When a DSC object is updated, the example object aggregator 220 adds a node to the leaf of a Merkle Tree that corresponds to changes in the file. Accordingly, the Merkle Tree updates with each access, edit, etc. to the data corresponding to the DSC object.

When aggregating data from two DSC object, the example object aggregator 220 of FIG. 2 may add corresponding nodes to the Merkle Tree such that the new Merkel tree includes nodes that correspond to the nodes of the two DSC objects that have been aggregated. For example, if media C1 and C2 are inputs to a DSC object where a matrix multiply is applied to each byte of the media, the object aggregator 220 would produce a log/history identifying C1 and C2 (e.g., by obtaining a SSI, by comping a digest over label identifying C1, or by computing a digest over the C1 media directly). Metadata about the C1 and C2 may include geolocation, who has copyright ownership, etc. A third media C3 may be generated that applies the matrix multiply transformation over C1 and C2. The metadata for C2 may describe the transformation function that was used, the location where the function was used, etc. When a transformation is applied the aggregator 220 and/or the example data structure generator 210 generates a revision. The resulting media revision object for C3 is hashed (e.g., using the encryptor 208) to produce a value that is included in the Merkle Tree. In some examples, it may be appropriate to allow multiple revisions of C2 before a final result is generated and added to the local Merkle Tree to allow for creative or random changes to occur without generating excessive entries in the Merkle Tree. The Merkle tree records workflow steps applied locally (e.g., received media C1, received media C2, applied transformation function F1, applied transformation function F2, generated media C3, etc.). The encryptor 208 hashes the root of the Merkle tree to generate a value representative of the current state of the DSC at the current time. Sub-tree nodes represent the state at an earlier point in time. By adding a local Merkle tree root to the blockchain, it is possible to serialize the state changes across multiple DSC objects. Subtrees of local object may occur in parallel. Thus, a serialization of subtree revisions may not be readily achievable. However, revision data can include a secure timestamp if that level of serialization is needed.

The example root of trust generator 222 performs hardware attestation on the processing device to develop a secure execution environment for generating and/or modifying a DSC object. For example, the root of trust generator 222 may implement an INTEL™ SGX protocol to implement the attestation. The example root of trust generator 222 obtains (e.g., via the network interface 202) a root of trust from a transmitting processing device that transmits (e.g., via a wired or wireless connection) a DSC object (e.g., the processing device 104-110 that transmitted an obtained DSC object) prior to processing the data from the transmitting processing device. The attestation structure reveals the root of trust architecture (e.g., which could be based on the INTEL™ SGX protocol where the SGX enclave implements the local DSC (LDSC) function as well as the crypto serialization, signing and encryption). The example root of trust generator 222 performs the hardware attestation by finding a suitable root of trust based on the received attestation, booting operation into a storage data pool environment that is tied to the root of trust, and using the data storage keys to import (e.g., encrypt) the DSC object and place it under portable data pools control.

The example object processor 224 of FIG. 2 processes DSC data objects received from the network 114. For example, the object processor 224 may verify an owner certificate path with a public key in a voucher, log the reception and/or modification of the received DSC object, and load tools included in the DSC object. In some examples, the object processor 224 determines if the changes of a DSC object should be collapsed into a single monolithic change and/or if data transformations need to be compensated to debug the data of the DSC object.

The example decryptor 226 of FIG. 2 decrypts a received DSC object based on the protocol used to encrypt the DSC object. For example, if the DSC object is encrypted using homomorphic encryption, the decryptor 226 decrypts using homomorphic decryption. In another example, if the DSC object is serialized, the example decryptor 226 can decrypt the DSC object based on the serialization protocol.

In the illustrated example of FIG. 2, the component interface 200 includes means for interacting and/or accessing data from other components of a processing device. In this example, the accessing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the component interface 200 implements the accessing means.

In the illustrated example of FIG. 2, the filter 204 includes means for filtering raw data. In this example, the filtering means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the filter 204 implements the filtering means.

In the illustrated example of FIG. 2, the file processor 206 includes means for determining if a new file has been generated, determining a data from the file should be filtered, determining if the data in a new file includes sensitive data, determining if a DSC object is controlled using self-sovereign identity, determining whether a new file corresponds to a particular format or structure, linking a DSC object to a new file, determining that a DSC object and/or file is limited to a particular device. In this example, the determining and/or linking means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the file processor 206 implements the determining and/or linking means.

In the illustrated example of FIG. 2, the encryptor 208 includes means for encrypting data, anonymizes sensitive data, hashing local data objects, generating a cryptographic hash of a label of the local data object, determining if a DSC object includes data for full or homomorphic encryption, and/or performing full or homomorphic encryption. In this example, the encrypting, anonymizing, hashing, generating, determining, and/or performing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the encryptor 208 implements the encrypting, anonymizing, hashing, generating, determining, and/or performing means.

In the illustrated example of FIG. 2, the data structure generator 210 includes means for generating a local data object, generating object metadata, a hierarchical data structure, a local commit log, and/or a revision(s) log, wrapping the change management metadata, updating metadata, adding data transformation tools, logging DSC object detection, incrementing an access count, updating the hierarchical data structure, local commit log, and/or revision log, determining whether changes should be collapsed, collapsing the changes, and/or generating data from child subtrees. In this example, the generating, adding, logging, updating, and/or determining means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the data structure generator 210 implements the generating, adding, logging, updating, and/or determining means.

In the illustrated example of FIG. 2, the proxy generator 212 includes means for establishing a proxy identifier. In this example, the establishing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the proxy generator 212 implements the establishing means.

In the illustrated example of FIG. 2, the encoder 216 includes means for encoding a DSC object and/or applying a data serialization format to a DSC object. In this example, the encoding and/or applying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the encoder 216 implements the encoding and/or applying means.

In the illustrated example of FIG. 2, the key generator 218 includes means for generating vouchers, generating data storage keys, and/or computing digest values. In this example, the generating and/or computing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the key generator 218 implements the generating and/or computing means.

In the illustrated example of FIG. 2, the object aggregator 220 includes means for debugging data of a DSC object, determining whether a first and second DSC object should be aggregated, and/or applying transitions to the first and second DSC object to generate a third DSC object. In this example, the debugging, determining, and/or applying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the object aggregator 220 implements the debugging, determining, and/or applying means.

In the illustrated example of FIG. 2, the root of trust generator 222 includes means for finding a suitable root of trust, booting a root of trust environment, and/or placing an encrypted DSC object under control of a storage data pool environment. In this example, the finding, booting, and/or placing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the root of trust generator 222 implements the finding, booting, and/or placing means.

In the illustrated example of FIG. 2, the object processor 224 includes means for verifying an owner certificate path, determining whether a DSC object includes data transformation tools, loading the tools, determining whether a file has been uploaded, determining if changes should be collapsed into a monolithic change, determining if a data transformation needs compensation, determining if auditing and/or tracking should be performed. In this example, the determining and/or verifying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples the object processor 224 implements the determining and/or verifying means.

In the illustrated example of FIG. 2, the decryptor 226 includes means for decrypting a DSC object. In this example, the decrypting means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples the decryptor 226 implements the decrypting means.

Figure 3A:
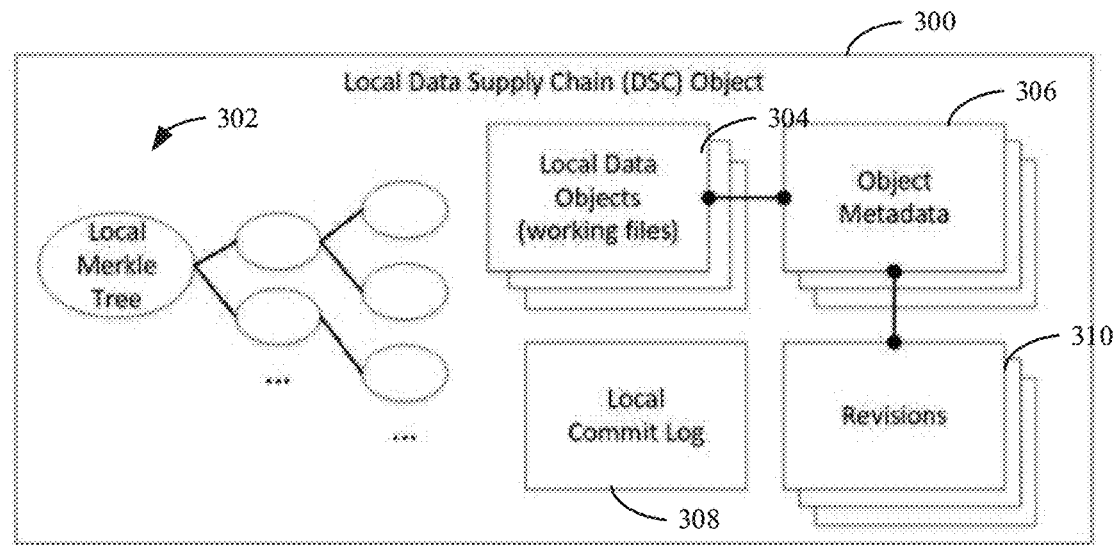
FIG. 3A illustrates an example data supply chain object.

FIG. 3A illustrates an example DSC object 300 that can be generated and/or modified by the example object manager 112a of FIG. 2 (e.g., or one of the example object managers 112b-e of FIG. 1). The example DSC object 300 includes an example local Merkle tree 302, example local data objects 304, example object metadata 306, an example local commit log 308, and an example revisions log 310.

The example local Merkle tree 302 of FIG. 3A corresponds to the data of the file that the DSC object 300 is linked to. The Merkle tree simplifies verification of integrity over mutating data. A leaf node of the local Merkle tree 302 is a hash of a unit of the data (e.g., a data block, a blob, a segment, a transaction record, etc.). The intermediate nodes of the local Merkle tree 302 are cryptographic hashes of the labels of their respective child nodes (e.g., the leaf nodes). The example local Merkle tree 302 allows for quick verification of data and any mutations over the data that have been labeled, hashed, and integrated cryptographically into a root of a subtree of the local Merkle tree 302. Although the example local data supply chain object 300 includes the example local Merkle tree 302, any hierarchical security structure may be used.

Data corresponding to the example local data objects 304 and the example object metadata 306 (e.g., version numbers, grants of access, records of access, revision made to either, tec.) of FIG. 3 are reflected by the nodes of the example local Merkle tree 302. Accordingly, the Merkle tree forms a system of interconnected data and metadata records that are protected (e.g., signed) by the corresponding codes in the local Merkle tree 302 and reflect the history of the data corresponding to the DSC object 300.

The example revisions log 310 of FIG. 3 includes information that tracks the revisions made on the data (e.g., file) that is attached to the DSC object 300. For example, if the data is an audio file and the audio file is edited by a sound engineer, the particular edits made by the engineer are documented in the revisions log 310. The example local commit log 308 corresponds to difference versions of the file (e.g., a saved version after one or more revisions of the file). Some or all the data in the example DSC object 300 may be replicated using a consistent hash-based distributed data store (e.g., Ceph file system) or a high-performance distributed database (e.g., Couch DB, levelDB, RocksDB, etc.).

Figure 3B:
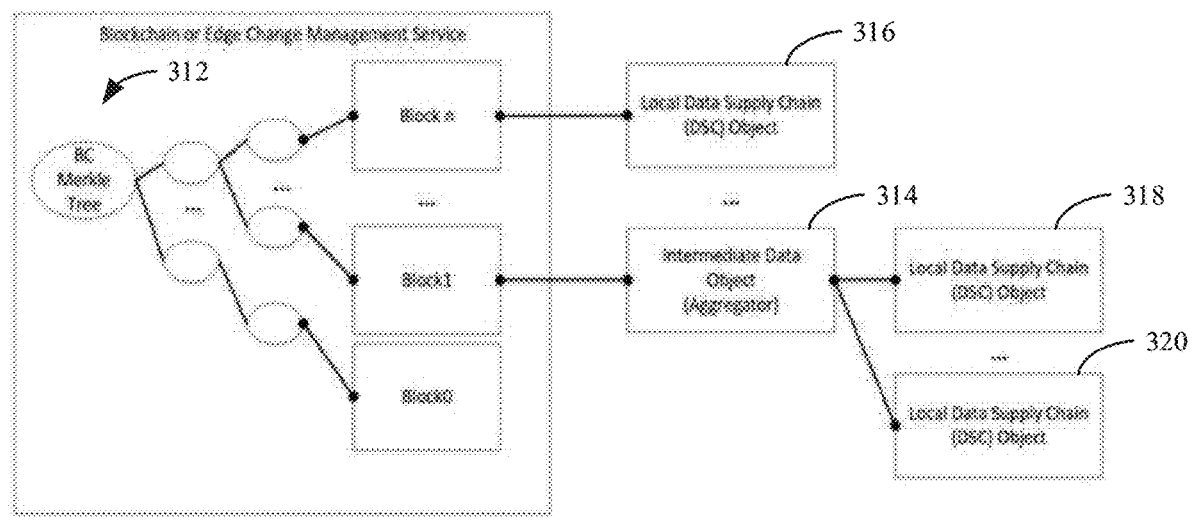
FIG. 3B illustrates an example blockchain Merkle tree that accepts data supply chain object updates as blockchain transactions.

FIG. 3B illustrates an example blockchain (BC) Merkle tree 312 that the example blockchain 116 and/or the example object monitoring service 118 uses to track/monitors DSC objects as they transition between the example processing devices 102, 104, 106, 108, 110 of FIG. 1. The blocks in FIG. 3B correspond to records of tracked DSC objects. Each block corresponding to a creation of a new DSC object (e.g., the hash of the record can uniquely identify the data object, or if it is an aggregated object then the block will include hashes of the combined object) or edits/changes to an already established data object (e.g., in this case the data object will be referenced by its hash, and the nature of the change will be recorded in the block).

The example BC Merkle tree 312 includes transaction blocks that include signed hashes over the compositions, and any mutations (e.g., transformations) that may be performed on them. The example BC Merkle tree is maintained by the example blockchain 116 and/or the example object monitoring service 118 to observe protocols for verifying and adding blocks to the example BC Merkle tree 312. Additionally, the example BC Merkle tree 312 is maintained for executing any smart contracts in the process, according to whether the organization includes a public, private, or mixed blockchain system.

The example local DSC objects 316, 318, 320 of FIG. 3B are structured the same as the example local DSC object 300 of FIG. 3A. In the illustrated example, the example local DSC object 316 (e.g., corresponding to Object A described above) is linked to Block n of the BC Merkle tree 312. In the illustrated example, it is uncertain whether the other example local DSC objects 318, 320 (e.g., such as a DSC Object X and a DSC Object Y) are uniquely named and/or distinguished until both are contributed to the blockchain. For example, a first processing device (D1) may contribute Object X independently from a second processing device (D2) that may contribute Object Y. In some examples, the blockchain 116 and/or the example object monitoring service 118 may disambiguate Object X and Object Y using the device names for the respective devices contributing the corresponding DSC objects (e.g., D1.X and D2.X, where D2.X=Object Y). However, if the DSC objects are not owned by the entity/device that updated the blockchain, the object may be assigned its own unique name. In this example, the relative position establishes name ownership since Block 1 occurs before Blockn. The example aggregated DSC object 314 can assert the name X resulting in the local DSC object 318 having to find a different name. In other examples, an objection identify creation may be implemented with a SSI system (E.g., Sovrin.org), where a SSI blockchain is used to establish ownership of an object name as a pre-requisite to contributing the DSC to the DSC blockchain 116. Additionally or alternatively, the blockchain 116 may be used to establish DSC object names by recording and checking for previous blocks including the duplicate names. Because names may be a digest of media, duplicate names may occur less often unless information of the DSC objects are identical. Uniqueness of object name does not necessarily mean infringement exists. Further analyzes of the DSC information may be needed.

While an example manner of implementing the example video processing system 100, the example object manager 112a, the example blockchain 116 and/or the example object monitoring serve 118 of FIG. 1 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example component interface 200, the example network interface 202, the example filter 204, the example file processor 206, the example encryptor 208, the example data structure generator 210, the example proxy generator 212, the example encoder 216, the example key generator 218, the example object aggregator 220, root of trust generator 222, the example object processor 224, the example decryptor 226, and/or, more generally, the example object manager 112a, the example blockchain 116 and/or the example object monitoring serve 118 of FIGS. 1 and/or 2 may be implemented by hardware, software, firmware and/or any combination of hardware, software and/or firmware. Thus, for example, any of the example filter 204, the example file processor 206, the example encryptor 208, the example data structure generator 210, the example proxy generator 212, the example encoder 216, the example key generator 218, the example object aggregator 220, root of trust generator 222, the example object processor 224, the example decryptor 226, and/or, more generally, the example object manager 112a, the example blockchain 116 and/or the example object monitoring serve 118 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example filter 204, the example file processor 206, the example encryptor 208, the example data structure generator 210, the example proxy generator 212, the example encoder 216, the example key generator 218, the example object aggregator 220, root of trust generator 222, the example object processor 224, the example decryptor 226, and/or, more generally, the example object manager 112a, the example blockchain 116 and/or the example object monitoring serve 118 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example video processing system 100 and/or the example object manager 112a, the example blockchain 116 and/or the example object monitoring serve 118 of FIGS. 1 and/or 2 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example object manager 112a, the example blockchain 116 and/or the example object monitoring serve 118 of FIGS. 1 and/or 2 are shown in FIGS. 3-9. The machine readable instructions may be one or more executable programs or portion(s) of an executable program for execution by a computer processor such as the processor 1012, 1012 shown in the example processor platform 1000, 1100 discussed below in connection with FIGS. 10 and/or 11. The program may be embodied in software stored on a non-transitory computer readable storage medium such as a CD-ROM, a floppy disk, a hard drive, a DVD, a Blu-ray disk, or a memory associated with the processor 1012, 1112, but the entire program and/or parts thereof could alternatively be executed by a device other than the processor 912 and/or embodied in firmware or dedicated hardware. Further, although the example program is described with reference to the flowcharts illustrated in FIGS. 3-9 many other methods of implementing the example object manager 112a, the example blockchain 116 and/or the example object monitoring serve 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4A:
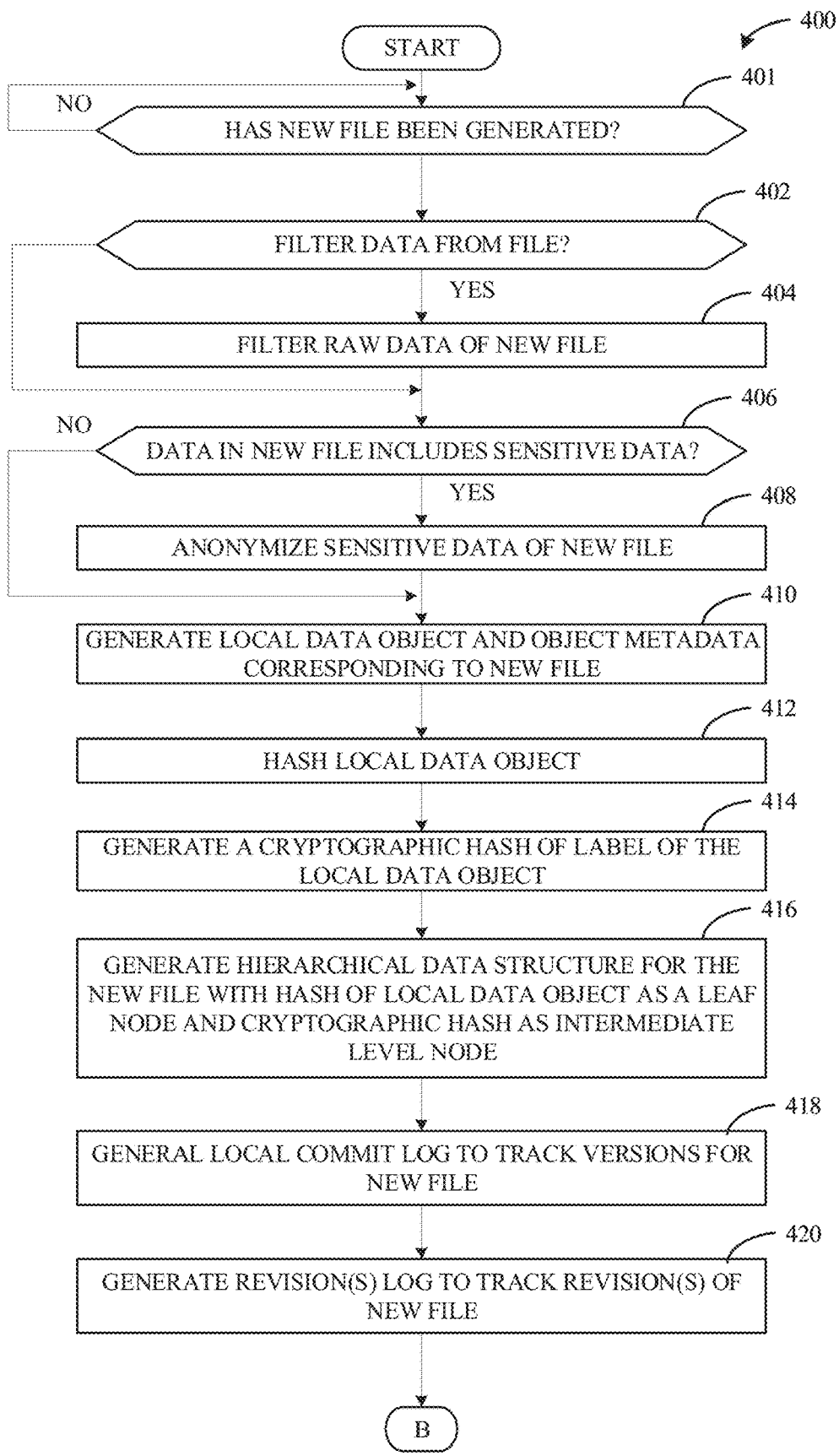
FIGS. 4-8 are flowcharts representative of example machine readable instructions which may be executed to implement the example object manager of FIGS. 1 and/or 2 to generate and/or modify a data supply chain object in accordance with teachings of this disclosure.
Figure 4B:
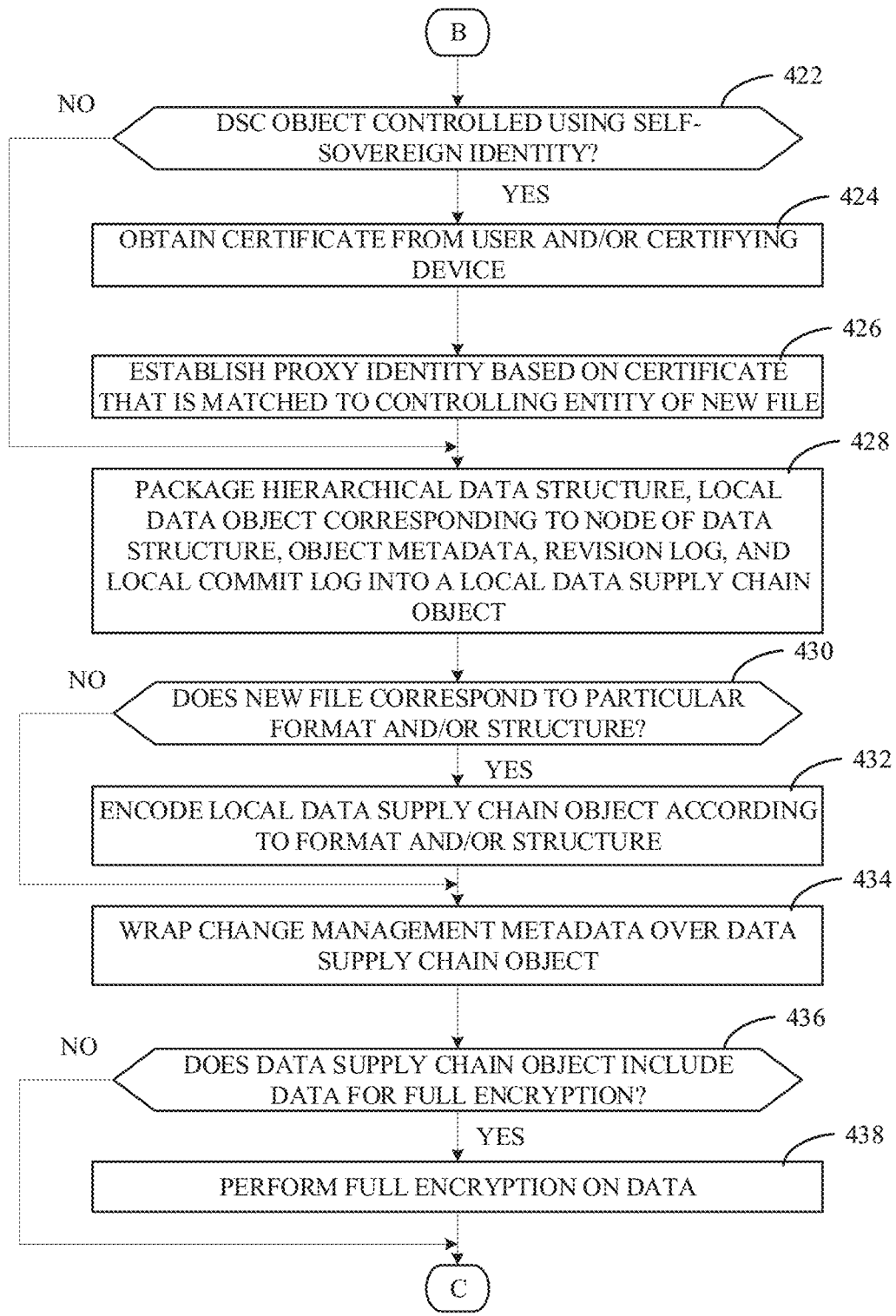
Figure 4C:
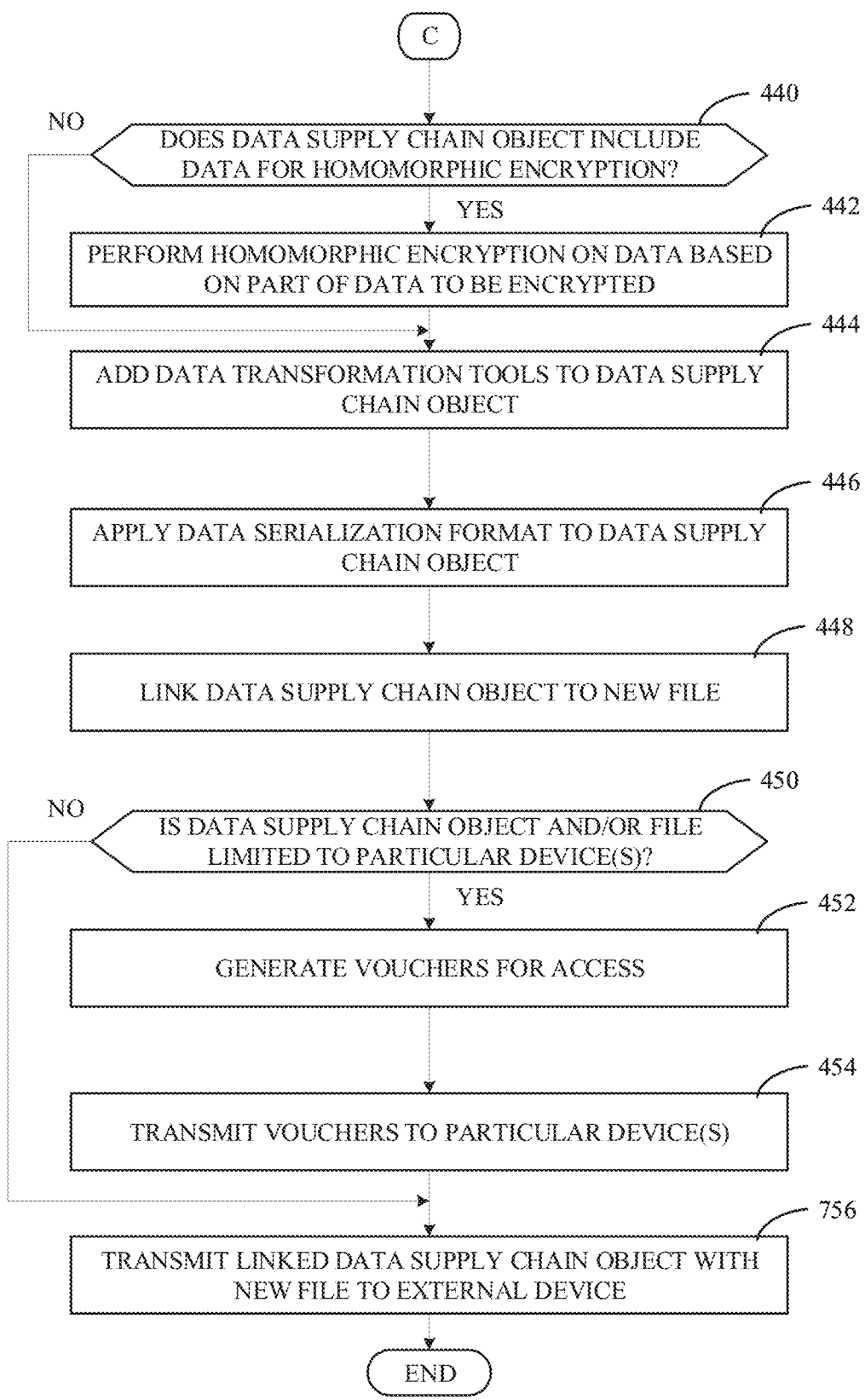

FIGS. 4A-4C include an example flowchart representative of machine readable instructions 400 that may be executed to implement the example object manager 112a of FIG. 2 to generate a DSC object (e.g., the DSC object 300 of FIG. 3A). The example instructions 400 of FIGS. 4A-4C are described from the perspective of the object manager 112a of FIG. 2 being used to implement the object manager 112a of the example processing device 102 of FIG. 1. However, in other examples, the example instructions 400 may be executed to implement the object managers 112b-e of any of the example processing devices 104-110 of FIG. 1 to generate DSC objects.

At block 401, the example file processor 206 determines if a new file been generated. For example, the component interface 200 may interact with the other components of the example processing device 102 to determine if a new file was generated. If the example file processor 206 determines that a new file has not been generated (block 401: NO), control returns to block 402 until a new file has been generated. If the example file processor 206 determines that a new file has been generated (block 401: YES), the example file processor 206 determines if the data from the file should be filtered (block 402). In some examples, the file processor 206 determines whether to filter the data from the file based on user and/or manufacturer preferences, and/or based on the type of file generated, etc.

If the example file processor 206 determines that the data from the file should not be filtered (block 402: NO), control continues to block 406. If the example file processor 206 determines that the data from the file should be filtered (block 402: YES), the example filter 204 filters the raw data of the new file (block 404). In some examples, how the data is filtered and/or how much data to filter is based on user and/or manufacture preferences. At block 406, the example file processor 206 determines if the data in the new file includes sensitive data. In some examples, the file processor 206 determines that the new file includes sensitive data when new file may be tagged as sensitive and/or when implemented in a device that only creates files that are sensitive.

If the example file processor 206 determines that the data in the new file does not include sensitive data (block 406: NO), control continues to block 410. If the example file processor 206 determines that the data in the new file includes sensitive data (block 406: YES), the example encryptor 208 anonymizes the sensitive data of the new file (block 408). The example encryptor 208 may anonymize the new file using any anonymization technique. At block 410, the example data structure generator 210 generates a local data object and object metadata corresponding to the new file. At block 412, the example encryptor 208 hashes the local data object using any hashing technique. At block 414, the example encryptor 208 generates a cryptographic hash of the label of the local data object using any cryptographic hashing technique. At block 416, the example data structure generator 210 generates a hierarchical data structure (e.g., Merkle tree structure) for the new file with the hash of the local data object as a leaf node and the cryptographic hash of the label as an intermediate level node.

At block 418, the example data structure generator 210 generates a local commit log to track versions for the new file. At block 420, the example data structure generator 210 generates revision(s) log to track revision(s) of the new file. At block 422, the example file processor 206 determines if the DSC object is controlled using self-sovereign identity. In some examples, an object may be controlled using self-sovereign identity based on user and/or manufacturer preferences. If the example file processor 206 determines that the DSC object is not controlled using self-sovereign identity (block 422: NO), control continues to block 428. If the example file processor 206 determines that the DSC object is controlled using self-sovereign identity (block 422: YES), the example component interface 200 and/or the example network interface 202 obtains a certificate from a user and/or a certifying device (block 424). At block 426, the example proxy generator 212 establishes a proxy identity based on the certificate that is matched to the controlling entity of the new file. The proxy identity may obscure personally identifiable data in the DSC object.

SSI means that the media belongs to an entity that asserts the SSI (e.g., for example the processing device 102 that generates the media). If the media ownership is transferred to another entity (e.g., another processing device 104 owned by a second entity), the other entity may wish to assert a new identity, one that identifies the new owner. In such an example, a proxy identity is an alias that is used while the media ownership is transferred. The proxy may become a new official name and the previous name may been marked as defunct. Use of certificates is a possible way to identify an authenticate media owners (e.g., using processing device 102 and/or processing device 104). It is possible that media owners use SSI themselves which can be difficult to keep clear in the workflow descriptions.

At block 428, the example data structure generator packages the hierarchical data structure, the local data object corresponding to a node of the data structure, object metadata, the revision log, and the local commit log into a local DSC object associated with the generated file detected at block 401. At block 430, the example file processor 206 determines whether the new file corresponds to a particular format or structure. If the example file processor 206 determines that the new file does not correspond to a particular format or structure (block 430: NO), control continues to block 434. If the example file processor 206 determines that the new file corresponds to a particular format or structure (block 430: YES), the example encoder 216 encodes the DSC object according to the formal and/or structure (block 432), as described above in conjunction with FIG. 2.

At block 434, the example data structure generator 210 wraps the change management metadata over the DSC object. For example, the data structure generator 210 updates the metadata of the new file (e.g., via the component interface 200). At block 436, the example encryptor 208 determines if the DSC object includes data for full encryption (e.g., archival class keys stored in HDD, SSD, tape etc., encryption with in-memory encryption keys, etc.). If the example encryptor 208 determines that the DSC object does not include data for full encryption (block 436: NO), control continues to block 340. If the example encryptor 208 determines that the DSC object includes data for full encryption (block 426: YES), the example encryptor 208 performs full encryption on the data (block 438). At block 440, the example encryptor 208 determines if the DSC object includes data for homomorphic encryption. If the example encryptor 208 determines that the DSC object does not include data for homomorphic encryption (block 440: NO), control continues to block 344. If the example encryptor 208 determines that the DSC object includes data for homomorphic encryption (block 440: YES), the example encryptor 208 performs homomorphic encryption on the data based on the part of the data to be encrypted (block 442).

At block 444, the example data structure generator 210 adds data transformation tools to the DSC object. The transformation tools that are added may depend on the type of data file that has been generated. At block 446, the example encoder 216 applies a data serialization format to the DSC object, as further described above in conjunction with FIG. 2. At block 448, the example file processor 206 links the DSC to the new file. In this manner, when the new file is updated and/or transmitted to another device (e.g., via a wired or wireless connection), the linked DSC object is updated and the history of the file is tracked by the example blockchain 116 and/or object monitoring service 118 based on the DSC object.

At block 450, the example file processor 206 determines if the DSC object and/or file is limited to particular device(s) (e.g., based on user and/or manufacturer preferences). If the example file processor 206 determines that the DSC object and/or file is not limited to particular device(s) (block 450: NO), control continues to block 756. If the example file processor 206 determines that the DSC object and/or file is limited to particular device(s) (block 450: YES), the example key generator 218 generates vouchers for access (block 452). The example key generator 218 generates the voucher to include a key wrapping key. At block 454, the example network interface 202 transmits (e.g., via a wired or wireless connection) the vouchers to the particular receiving device(s). In this manner, the receiving devices can access the DSC objects using the voucher. At block 756, the example network interface 202 transmits (e.g., via a wired or wireless connection) the linked DSC object with the new file to external device (e.g., another processing device 104, 106, 108, 110, the blockchain 116, and/or the object monitoring service 118 that requests the file).

Figure 5:
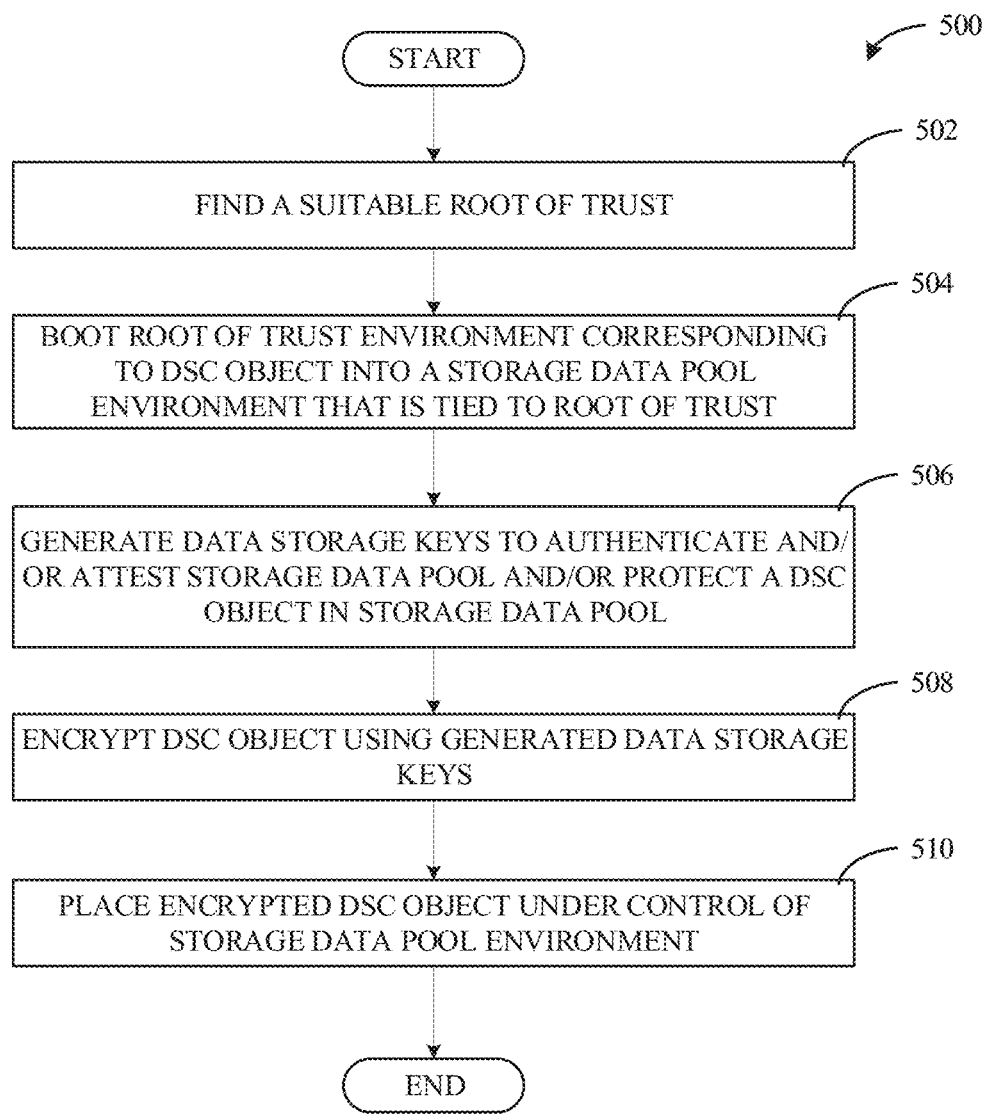

FIG. 5 is an example flowchart representative of machine readable instructions 500 that may be executed to implement the example object manager 112a of FIG. 2 to establish a secure environment in any one of the processing devices 102. However, in other examples, the example instructions 500 may be executed to implement the object managers 112b-e of any of the example processing devices 104-110 of FIG. 1 to establish a secure environment in any one of the processing devices 104, 106, 108, 110.

At block 502, the root of trust generator 222 finds a suitable root of trust. For example, the root of trust generator 222 may receive an attestation from a sending device (e.g., another one of the processing devices 104, 106, 108, 110) before processing the data from the sending device. The attestation identifies the suitable root of trust (e.g., one or more components of the processing device). The root of trust architecture could be based on INTEL™ SGX where the SGX enclave implements the linkage disequilibrium score regression (LDSC) functions as well as the crypto serialization, signing, and encryption. At block 504, the example root of trust generator 222 boots the root of trust environment corresponding to DSC object into a storage data pool environment that is tied to the root of trust. At block 506, the example key generator 218 generates data storage keys to authenticate and/or attest the storage data pool and/or protect a DSC object in the storage data pool. At block 508, the example encoder 216 encrypts the DSC object using the generated data storage keys. For example, the encoder 216 may encode using asymmetric keys, symmetric keys, and/or a peer-peer key exchange. The example blockchain 116 and the example object monitoring service 118 may perform key management services so that other processing devices can decrypt the encrypted DSC object. At block 510, the example root of trust generator 222 places the encrypted DSC object under control of a storage data pool environment.

Figure 6:
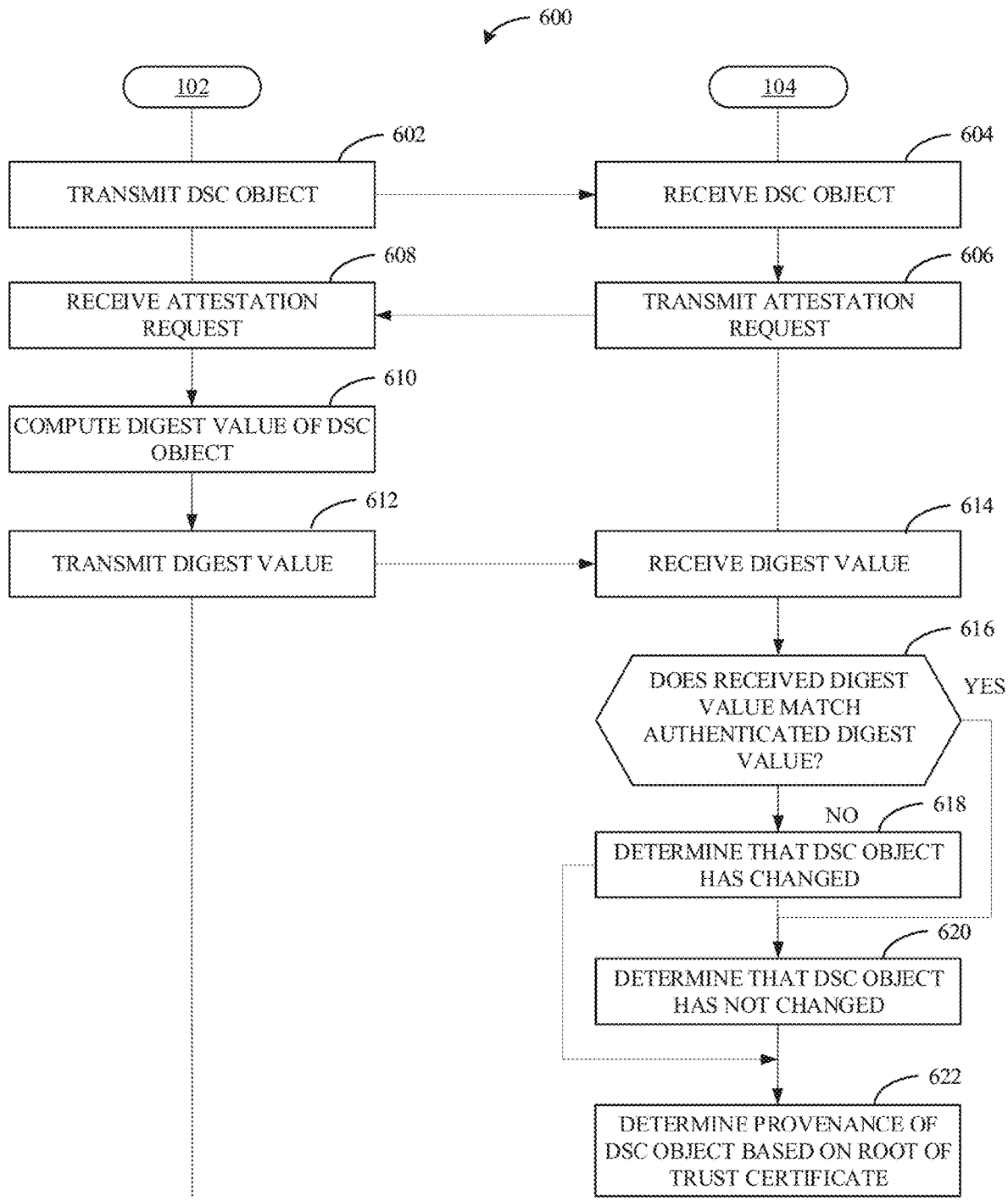

FIG. 6 is an example flowchart representative of machine readable instructions 600 that may be executed to implement the example object manager 112a of FIG. 2 of the example processing device 102 and the example processing device 104 to determine whether a DSC object has changed and/or if provenance of the DSC object has occurred. The flowchart of FIG. 6 illustrates a process where an attestation describes a computer (e.g., software and/or firmware) that manipulates the DSC object and includes the DSC object as well. A verifier walks a chain of attestation values that link the computer's execution environment to the data object. The exchange of a DSC object from the processing device 102 to the processing device 104 verifies the linkage of the DSC object to the processing device 102 and that no intermediary modified the DSC object as part of the exchange. In some examples, the example instructions 600 may be executed to implement the object managers 112a-e of any of the example processing devices 102-110 of FIG. 1 to determine whether a DSC object has changed and/or if provenance of the DSC object has occurred.

At block 602, the example network interface 202 of the processing device 102 transmits (e.g., via a wired or wireless connection) a DSC object to the example processing device 104. At block 604, the example network interface 202 of the processing device 104 receives the DSC object. At block 606, the example network interface 202 transmits (e.g., via a wired or wireless connection) an attestation request to the example processing device 102. The attestation request is a trusted layer component to link a root of trust to measure the DSC object or one of its subcomponents including the local Merkle digits value to if the DSC object has changed between the current and a prior interaction.

At block 608, the example network interface 202 of the processing device 102 receives the attestation request. At block 610, the example key generator 218 computes a digest value of the DSC object (e.g., using a hash algorithm (SHA2 or MD5)). At block 612, the example network interface 202 of the processing device 102 transmits (e.g., via a wired or wireless connection) the digest value to the processing device 104. At block 614, the example network interface 202 of the processing device 104 receives the digest value. At block 616, the example object processor 224 determines if the received digest value matches an authenticated digest value (e.g., that may be from the blockchain 116 and/or the object monitoring service 118).

If the example object processor 224 determines that the received digest value does not match the authenticated digest value (block 616: NO), the object processor 224 determines that the DSC object has changed (block 618). If the example object processor 224 determines that the received digest value matches the authenticated digest value (block 616: YES), the object processor 224 determines that the DSC object has not changed (block 620). If the object changed then it could correspond to revision of the DSC object, corruption of the DSC object, etc. If the object processor 224 determines that the DSC object has changed, the object processor 224 may send an alert to the blockchain 116 and/or object monitoring service 118 or may do further investigation. Attestation determines trustworthiness of the computer that is managing the DSC objects, which may be established prior to accepting a DSC object.

At block 622, the example object processor 224 determines provenance of the DSC object based on a root of trust certificate. The root of trust certificate is published by each device when its onboarded into the network. Accordingly, the onboarding and/or vetting of a DSC object is applied as part of establishing the LDSC environment based on a root of trust. The object processor 224 determines the provenance by checking the root of trust certificate or other certificate in a certificate path including the root of trust certificate. Root of trust certificates may lead to an original equipment manufacturing and/or to a current organizational owner of the root of trust components. Both provide data provenance and establish current custodial context. The portable data pool is also a data custodian. The vendor issued a device certificate (e.g., initial device identifier (IDevID)) or owner issued local device identifier (LDevID)) cert that informs the verifier as to what the Root of trust semantics are. A policy on the consuming device identifies whether it is appropriate to continue working with the DSC object.

Figure 7A:
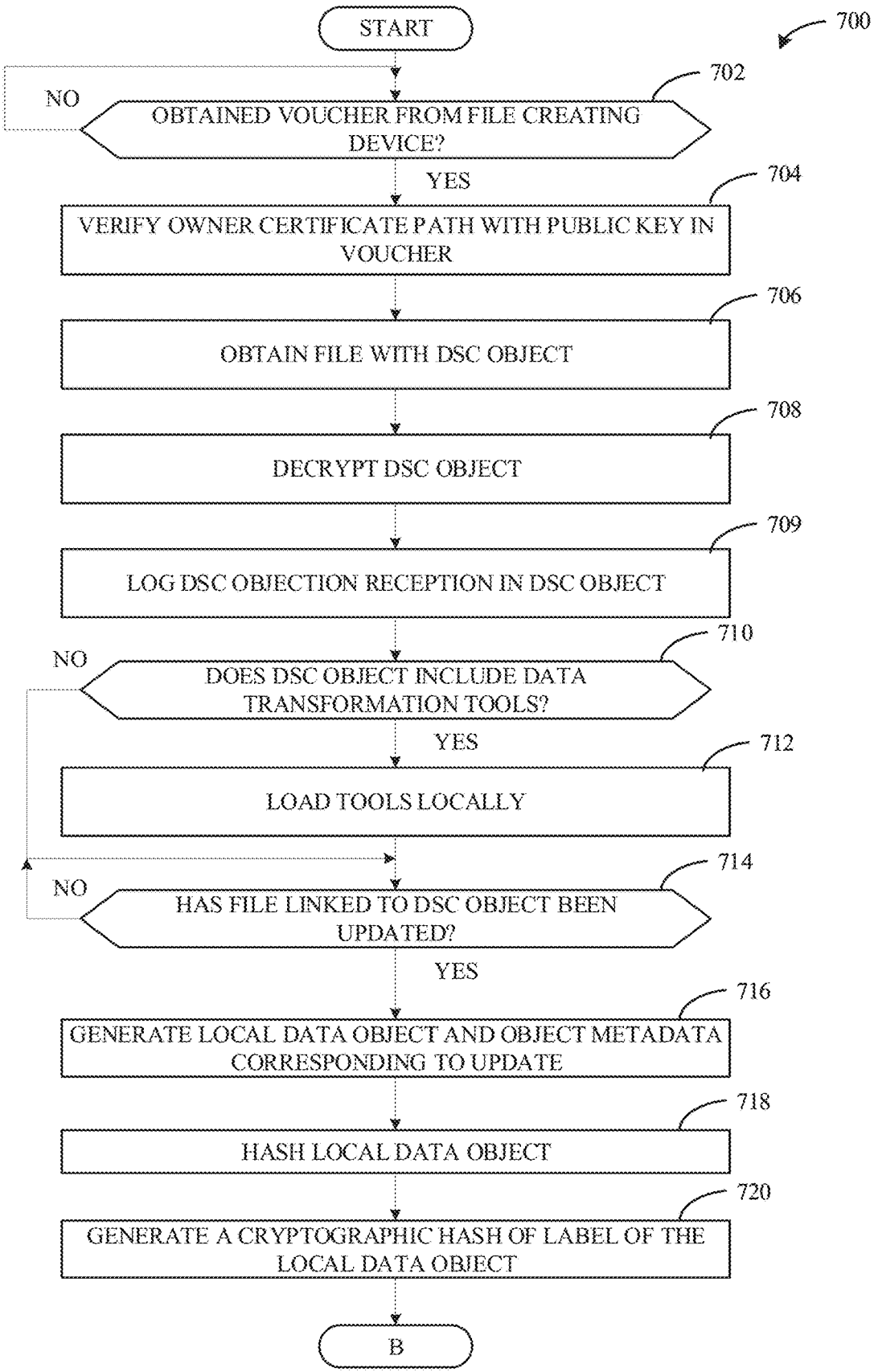
Figure 7B:
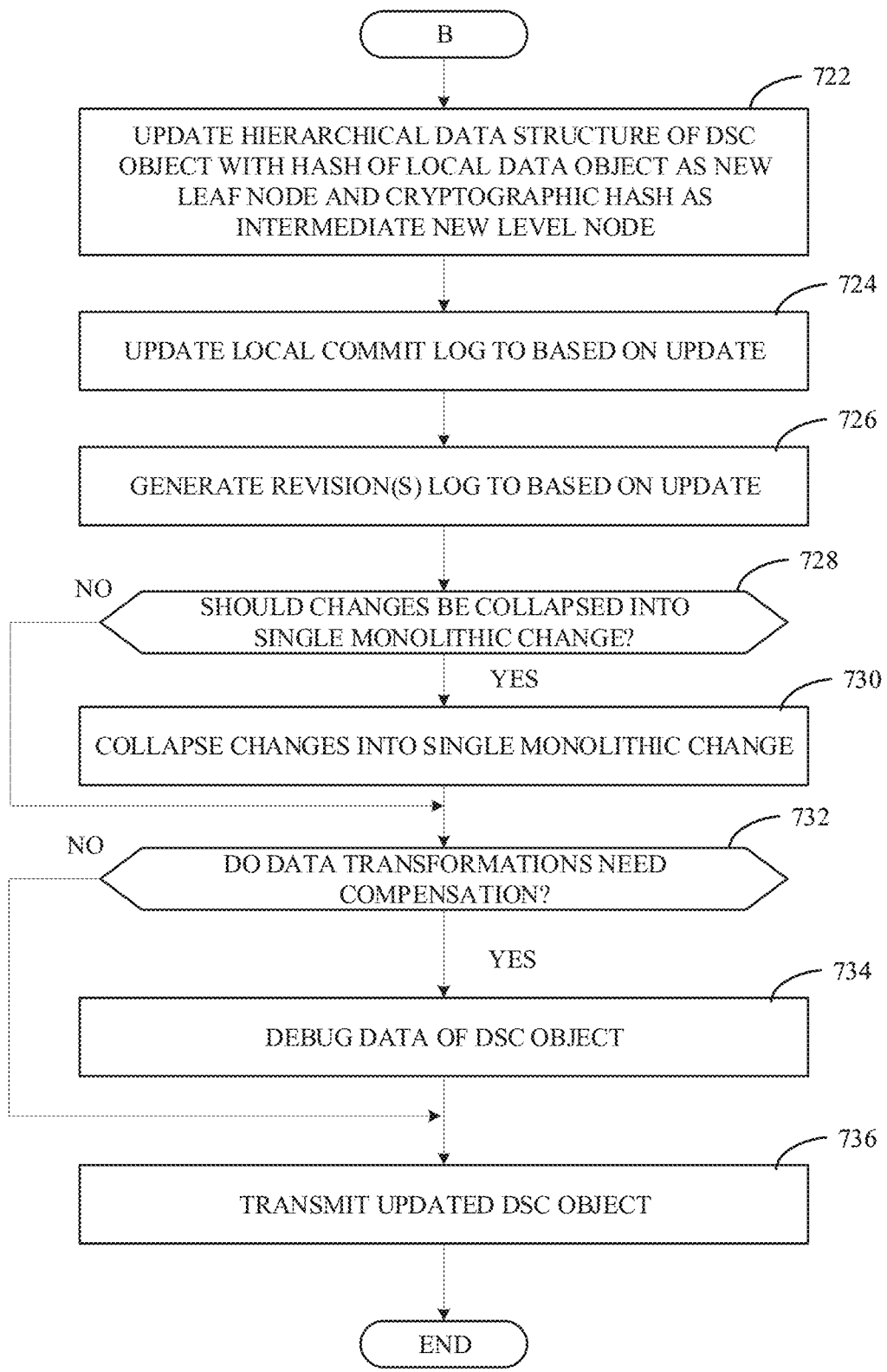

FIGS. 7A-B illustrate an example flowchart representative of machine readable instructions 700 that may be executed to implement the example object manager 112a of FIG. 2 to modify a received DSC object as part of a transfer of ownership of a DSC object from one computer owned by a first entity to a second computer owned by a second entity. The data is bound to the computer and the computer is unambiguously linked to an entity to ensure that the data custody is unambiguous. However, in other examples, the example instructions 700 may be executed to implement the object managers 112b-e of any of the example processing devices 104-110 of FIG. 1 to modify a received DSC object.

At block 702, the example network interface 202 determines if a voucher from the file creating device was obtained (e.g., the processing device 102). If the example network interface 202 determines that a voucher has not been obtained (block 702: NO), control returns to block 702 until a voucher is received. If the example network interface 202 determines that a voucher has been obtained (block 702: YES), the example object processor 224 verifies the owner certificate path with a public key embedded in the voucher (block 704). At block 706, the example network interface 202 obtains a file linked with a DSC object. At block 708, the example decryptor 226 decrypts the DSC object based on how the DSC object was encrypted. At block 709, the example data structure generator 210 logs the DSC object reception in the DSC object. For example, the data structure generator 210 can increment an access count that may be part of a local data object and/or metadata.

At block 710, the example object processor 224 determines if the DSC object includes data transformation tools. If the example object processor 224 determines that the DSC object does not include data transformation tools (block 710: NO), control continues to block 714. If the example object processor 224 determines that the DSC object includes data transformation tools (block 710: YES), the example object processor 224 loads the tools locally at the processing device (block 712). At block 714, the example object processor 224 determines if the file linked to the DSC object has been updated (e.g., a user of the processing device has updated the file). If the example object processor 224 determines that the file has not been updated (block 714: NO), control returns to block 714 until the file is updated. If the example object processor 224 determines that the file has been updated block 714: YES), the data structure generator 210 generates a local data object and object metadata corresponding to the update (block 716). At block 718, the example encoder 216 hashes the local data object. At block 720, the example encoder 216 generates a cryptographic hash of the label of the local data object.

At block 722, the example data structure generator 210 updates the hierarchical data structure of the DSC object with the hash of the local data object as a new leaf node and cryptographic hash as an intermediate new level node. At block 724, the example data structure generator 210 updates the local commit log based on the update. At block 726, the example data structure generator 210 generates the revision log based on the update. At block 728, the example object processor 224 determines if the changes should be collapsed into a single monolithic change. If multiple changes are applied by a same entity, the changes may be collapsed. For example, if a user tries multiple times to spell a word correctly before getting it correct, only the final spelling is recorded. If the example data structure generator 210 determines that the changes should not be collapsed (block 728: NO), control continues to block 732. Changes should not be collapsed if there are changes applied by different entities. Each change is applied by a different entity then merged back into the DSC object resulting in a new media C2. The log of the DSC object records the details about each entity and what changes were made to produce the different versions. If the example data structure generator 210 determines that the changes should collapse (block 728: YES), the example data structure generator 210 collapses the changes into a single monolithic change (block 730).

At block 732, the example object processor 224 determines if the data transformation need compensation. The object processor 224 determines that compensation of the data transformation may be needed when the input data object and/or linked media is copyright protected. For example, if the media is copyright protected, the object processor 224 evaluates if the transformation fits fair use, licensed use, unlicensed use, or another designation. Some use designations may require monetary compensation transactions, others may require access control, while others may require heightened logging, auditing, etc. If the example object processor 224 determines that data transformation is not needed (block 732: NO), control continues to block 736. If the example object processor 224 determines that data transformation is needed (block 732: YES), the example object aggregator 220 debugs the data of the DSC object (block 734). At block 736, the example network interface 202 transmits (e.g., via a wired or wireless connection) the update DSC object to another processing deice, the blockchain 116, and/or the example object monitoring service 118.

Figure 8:
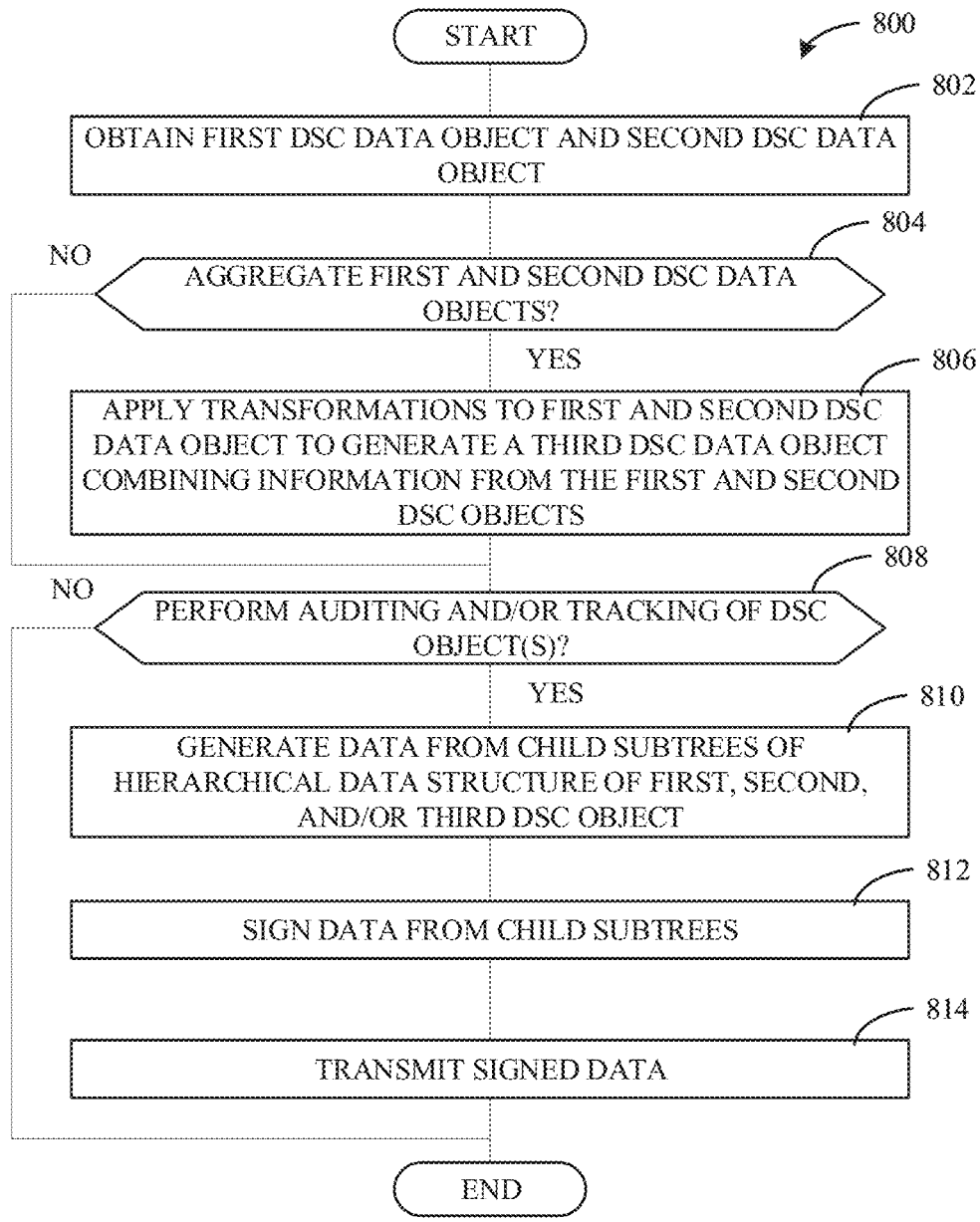

FIG. 8 is an example flowchart representative of machine readable instructions 800 that may be executed to implement the example object manager 112a of FIG. 2 of the example processing device 102 to aggregate DSC data objects. However, in other examples, the example instructions 800 may be executed to implement the object managers 112b-e of any of the example processing devices 104-110 of FIG. 1 to aggregate DSC data objects.

At block 802, the example network interface 202 obtains a first DSC data object and a second DSC data object. At block 804, the example object aggregator 220 determines if the first and second DC objects should be aggregated. The decision whether to aggregate is application dependent. For example an Edge function as a service (FaaS) workflow may include a FaaS server combined with an Edge orchestration and/or workflow execution plan that are used to implement a particular set of transformation. In such an example, the Edge computing environment is an information centric network and/or name function network where computing nodes show interest in various DSC objects that are delivered by the information centric network and/or named function network to the interested nodes who apply the transformation/aggregation that they are programmed to apply. If the example network interface 202 determines that the first and second DSC data objects should not be aggregated (block 804: NO), control continues to block 808. If the example network interface 202 determines that the first and second DSC object should be aggregated (block 804: YES), the example object aggregated 220 applies transformations to the first and second DSC data object to generate a third DSC data object combining information from the first and second DSC objects (block 806).

At block 808, the example object processor 224 determines if auditing and/or tracking of the DSC object should be performed. The auditing and/or tracking may be performed periodically, periodically, and/or based on a trigger. If the example object processor 224 determines that auditing is not to be performed (block 808: NO), control ends. If the example object processor 224 determines that auditing is to be performed (block 808: YES), the example data structure generator 210 generates data from child subtrees of the hierarchical data structure of the first, second, and/or third data objects, for example, by adding a leaf node to the Merkle tree of DSC object (block 810). The leaf nodes form a sequence that is strictly ordered. For any given intermediate node in the tree, there is a subtree of nodes that includes a segment of the chain. The root node includes the entire chain. At block 812, the example encoder 216 signs the data from the subtrees. At block 814, the example network interface 202 transmits (e.g., via a wired or wireless connection) the signed data to another processing device, the blockchain 116, and/or the example object monitoring service 118.

Figure 9:
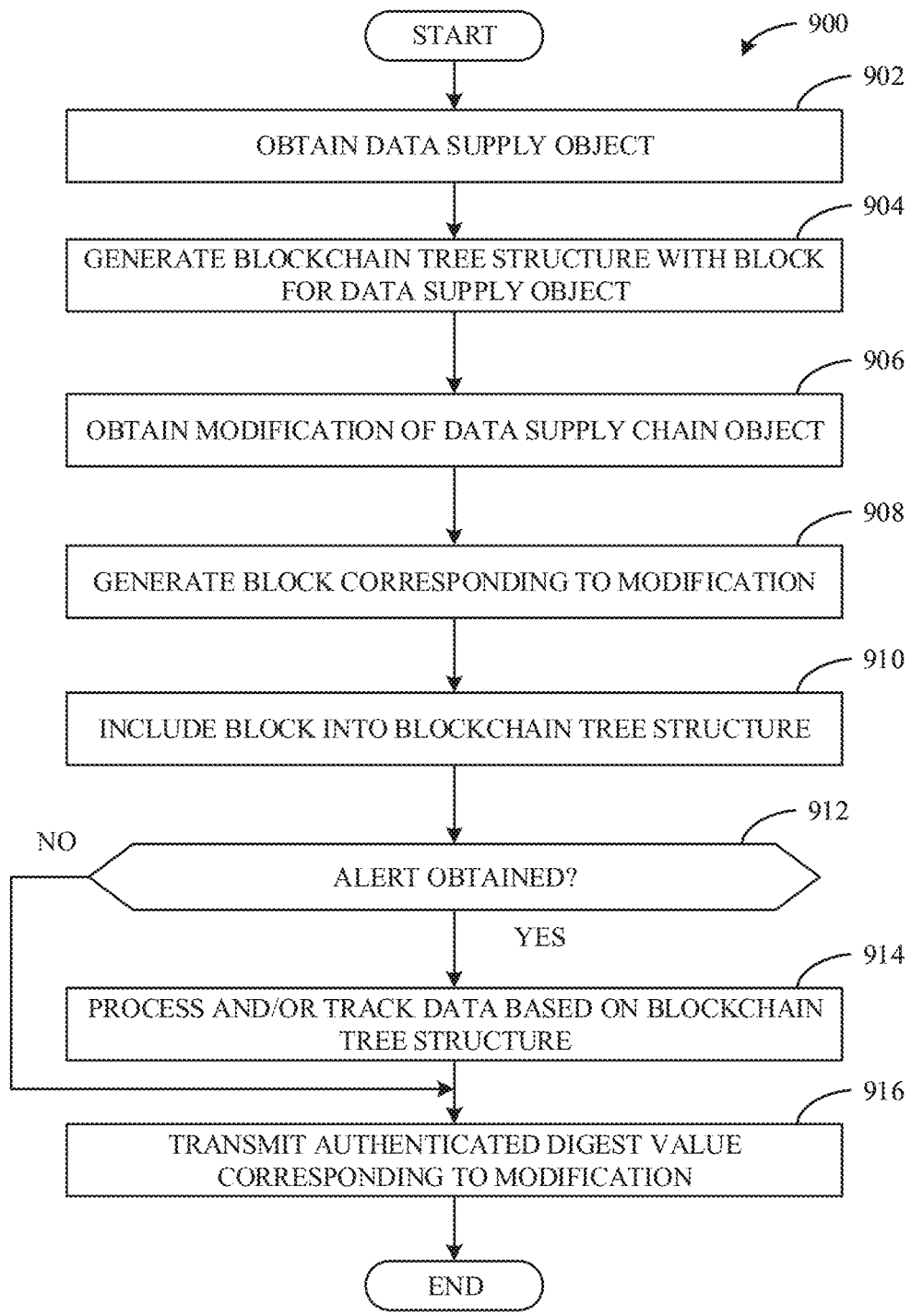
FIG. 9 is a flowchart representative of example machine readable instructions which may be executed to implement the example blockchain and/or object monitoring service of FIG. 1 to track data using a tree structure corresponding to one or more data supply chain objects in accordance with teachings of this disclosure.

FIG. 9 is an example flowchart representative of machine readable instructions 900 that may be executed to implement the example blockchain 116 and/or the example object monitoring service 118 of FIG. 1 to track changes to and/or accesses of data linked to one or more DSC object(s).

At block 902, the example blockchain 116 and/or the example object monitoring service 118 obtains a DSC object from one of the processing devices 102-110. For example, when new data and a corresponding new DSC object is created, the example processing device 102-110 transmits the newly generated DSC object to the example blockchain 116 and/or the example object monitoring service 118. As described above, the example blockchain 116 and/or the example object monitoring service 118 may recognize a presence of the new DSC object using a distributed consensus algorithm.

At block 904, the example blockchain 116 and/or the example object monitoring service 118 generates a blockchain tree structure (e.g., the example BC Merkle tree 312 of FIG. 3B) with a block for the obtained DSC object. At block 906, the example blockchain 116 and/or the example object monitoring service 118 obtains a modification of the DSC object corresponding to, for example, a change, an access, an adjustment, etc. to the data linked to the DSC object. For example, when the data linked to the DSC object is sent from (A) a processing device that generates the data to (B) a different processing device and/or entity, the DSC object updates to reflect the access of the data and/or any changes to the data at the different processing device and/or entity.

At block 908, the example blockchain 116 and/or the example object monitoring service 118 generates a block corresponding to the modification of the DSC object. At block 910, the example blockchain 116 and/or the example object monitoring service 118 includes the block into the BC Merkle tree 312 of FIG. 3B. In this manner, the changes, accesses, etc. associated with the data linked to the DSC object are tracked in the example BC Merkle tree 312 of FIG. 3B. Accordingly, the example blockchain 116 and/or the example object monitoring service 118 can process the BC Merkle tree 312 of FIG. 3B to track use and/or modifications of data in the system architecture 100 based on the DSC objects of the BC Merkle tree 312 to enforce contracts, and/or otherwise monitor the history of the data.

At block 912, the example blockchain 116 and/or the example object monitoring service 118 determines if an alert has been obtained from one of the processing devices 102-110 and/or from any interested party. The alert triggers the example blockchain 116 and/or the example object monitoring service 118 to process the BC Merkle tree 312 to identify information corresponding to use of the data identified in the alert. If the example blockchain 116 and/or the example object monitoring service 118 determines that an alert has not been obtained (block 912: NO), control continues to block 916.

If the example blockchain 116 and/or the example object monitoring service 118 determines that an alert has been obtained (block 912: YES), the example blockchain 116 and/or the example object monitoring service 118 processes and/or tracks the data identified in the alert based on the blockchain tree structure 914 (block 914). For example, the example blockchain 116 and/or the example object monitoring service 118 can process the blocks of the blockchain tree structure to ensure that accesses and/or changes to the data identified in the alert are authorized and/or if a fee should be paid (e.g., based on an agreement and/or contract). In some examples, an alert is not needed and the example blockchain 116 and/or the example object monitoring service 118 can process the blockchain for monitoring and/or contractual purposes periodically, aperiodically, and/or based on an additional or alternative trigger (e.g., when BC Merkle tree 312 is updated). At block 916, the example blockchain 116 and/or the example object monitoring service 118 transmits an authenticated digest value corresponding to a modification to the data identified in the alert to one or more of the processing devices 102-108, as further described above in conjunction with FIG. 6.

Figure 10:
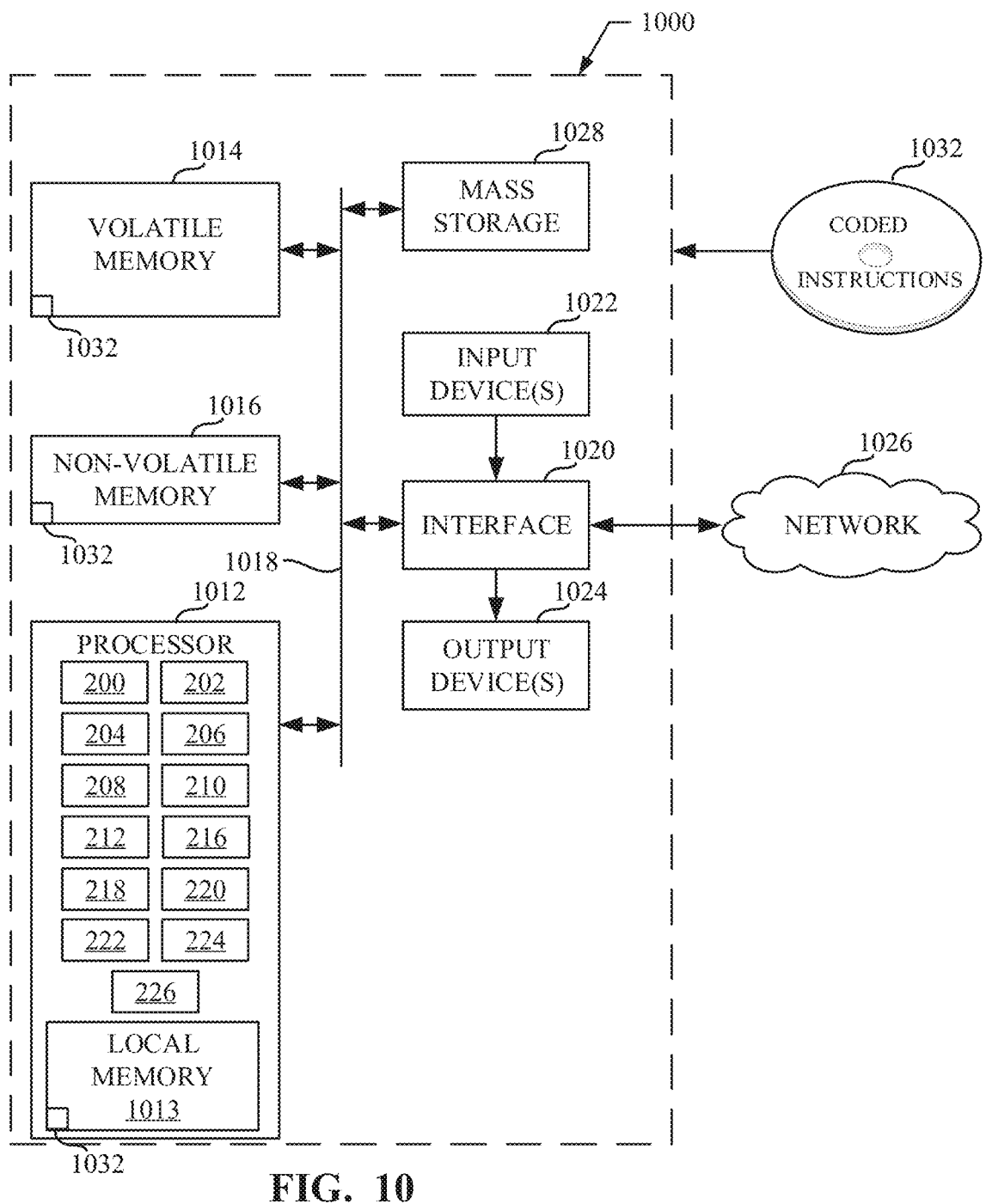
FIG. 10 is a block diagram of an example processing platform structured to execute the instructions of FIGS. 4-8 to implement the example object manager of FIGS. 1 and/or 2.

FIG. 10 is a block diagram of an example processor platform 1000 structured to execute the instructions of FIGS. 3-8 to implement the object manager 112a of FIG. 2 and/or the object managers 112b-e of FIG. 1. In some examples, the processor platform 1000 can be used to implement an Edge node in an edge computing environment. The processor platform 1000 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example filter 204, the example file processor 206, the example encryptor 208, the example data structure generator 210, the example proxy generator 212, the example encoder 216, the example key generator 218, the example object aggregator 220, root of trust generator 222, the example object processor 224, and the example decryptor 226.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAIVIBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In this example, the interface circuit 1030 implemented the example network interface 202 of FIG. 2.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 3-8 may be stored in the mass storage device 1028, in the volatile memory 1014, in the non-volatile memory 1016, and/or on a removable non-transitory computer readable storage medium such as a CD or DVD.

Figure 11:
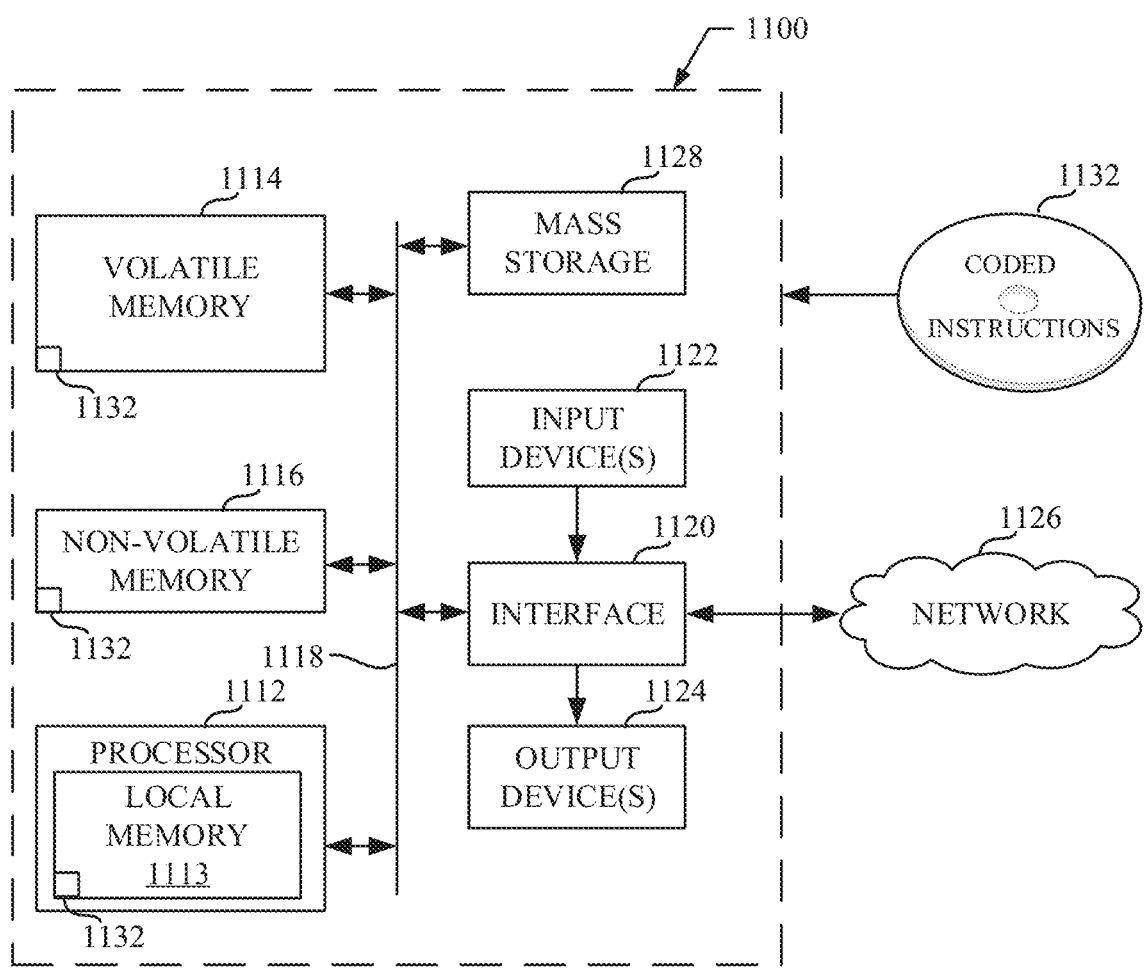
FIG. 11 is a block diagram of an example processing platform structured to execute the instructions of FIG. 9 to implement the example blockchain and/or object monitoring service of FIG. 1.

FIG. 11 is a block diagram of an example processor platform 1100 structured to execute the instructions of FIG. 9 to implement the example blockchain 116 and/or the example object monitoring serve 118 of FIG. 1. In some examples, the processor platform 1100 can be used to implement an Edge node in an edge computing environment. The processor platform 1100 can be, for example, a server, a personal computer, a workstation, a web plugin tool, a self-learning machine (e.g., a neural network), a mobile device (e.g., a cell phone, a smart phone, a tablet such as an iPad'), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface. In this example, the interface circuit 1130 implemented the example network interface 202 of FIG. 2.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 9 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that determine provenance for data supply chains. The disclosed methods, apparatus and articles of manufacture improve the efficiency of using a computing device by facilitate tracking of various types of data, thereby allowing media creators to protect intellectual property rights in a distributed and decentralized data ecosystem. Examples disclosed herein allow media owners to independently audit inferences generated by AI-driven entities. Examples disclosed herein provide automatic merges of data that results in new compositions that can be tracked through a data supply chain. Examples disclosed herein a computational infrastructure that can host a decentralized workload and provide AI platform security components for enhancing security of the system and the data being processed within the system. The disclosed methods, apparatus and articles of manufacture are accordingly directed to one or more improvement(s) in the functioning of a computer.

Example methods, apparatus, systems, and articles of manufacture to determine provenance for data supply chains are disclosed herein. Further examples and combinations thereof include the following: Example 1 includes a non-transitory computer readable storage medium comprising data which may be configured into executable instructions and, when configured and executed, cause one or more processors to at least in response to data being generated, generate a local data object and object metadata corresponding to the data, hash the local data object, generate a hash of a label of the local data object, generate a hierarchical data structure for the data including the hash of the local data object and the hash of the label of the local data object, generate a data supply chain object including the hierarchical data structure, and transmit the data and the data supply chain object to a device that requested access to the data.

Example 2 includes the computer readable storage medium of example 1, wherein the instructions cause the one or more processors to encode the data supply chain object according to a format of the data.

Example 3 includes the computer readable storage medium of example 1, wherein the instructions cause the one or more processors to encrypt the data supply chain object using homomorphic encryption.

Example 4 includes the computer readable storage medium of example 1, wherein the instructions cause the one or more processors to add a tool for transforming the data into the data supply chain object.

Example 5 includes the computer readable storage medium of example 1, wherein the instructions cause the one or more processors to apply a data serialization format to the data supply chain object.

Example 6 includes the computer readable storage medium of example 1, wherein the instructions cause the one or more processors to link the data supply chain object to the data.

Example 7 includes the computer readable storage medium of example 1, wherein the instructions cause the one or more processors to update the data supply chain object to reflect at least one of an access of the data or a transformation of the data.

Example 8 includes the computer readable storage medium of example 7, wherein the instructions cause the one or more processors to decrypt the data supply chain object using homomorphic decryption.

Example 9 includes the computer readable storage medium of example 1, wherein the instructions cause the one or more processors to transmit the data supply chain object to at least one of a blockchain or an object monitoring service to at least one of (a) enforce a contract corresponding to the data, (b) record revisions to the data, (c) enforce data provenance, or (d) track the data.

Example 10 includes an apparatus to generate a data supply chain object, the apparatus comprising a data structure generator to, in response to data being generated, generate a local data object and object metadata corresponding to the data, an encryptor to hash the local data object, and generate a hash of a label of the local data object, the data structure generator to generate a hierarchical data structure for the data including the hash of the local data object and the hash of the label of the local data object, and generate a data supply chain object including the hierarchical data structure, and an interface to transmit the data and the data supply chain object to a device that requested access to the data.

Example 11 includes the apparatus of example 10, further including an encoder to encode the data supply chain object according to a format of the data.

Example 12 includes the apparatus of example 10, wherein the encryptor is to encrypt the data supply chain object using homomorphic encryption.

Example 13 includes the apparatus of example 10, wherein data structure generator is to add a tool for transforming the data into the data supply chain object.

Example 14 includes the apparatus of example 10, further including an encoder to apply a data serialization format to the data supply chain object.

Example 15 includes the apparatus of example 10, further including a file processor to link the data supply chain object to the data.

Example 16 includes the apparatus of example 10, wherein the data structure generator to update the data supply chain object to reflect at least one of an access of the data or a transformation of the data.

Example 17 includes the apparatus of example 16, further including a decryptor to decrypt the data supply chain object using homomorphic decryption.

Example 18 includes the apparatus of example 10, wherein the interface is to transmit the data supply chain object to at least one of a blockchain or an object monitoring service to at least one of (a) enforce a contract corresponding to the data, (b) record revisions to the data, (c) enforce data provenance, or (d) track the data.

Example 19 includes a method for generating a data supply chain object, the method comprising in response to data being generated, generating, by executing an instruction with a processor, a local data object and object metadata corresponding to the data, hashing, by executing an instruction with the processor, the local data object, generating, by executing an instruction with the processor, a hash of a label of the local data object, generating, by executing an instruction with the processor, a hierarchical data structure for the data including the hash of the local data object and the hash of the label of the local data object, generating, by executing an instruction with the processor, a data supply chain object including the hierarchical data structure, and transmitting the data and the data supply chain object to a device that requested access to the data.

Example 20 includes the method of example 19, further including encoding the data supply chain object according to a format of the data.

Example 21 includes the method of example 19, further including encrypting the data supply chain object using homomorphic encryption.

Example 22 includes the method of example 19, further including adding a tool for transforming the data into the data supply chain object.

Example 23 includes the method of example 19, further including applying a data serialization format to the data supply chain object.

Example 24 includes the method of example 19, further including linking the data supply chain object to the data.

Example 25 includes the method of example 19, further including updating the data supply chain object to reflect at least one of an access of the data or a transformation of the data.

Example 26 includes the method of example 25, further including decrypting the data supply chain object using homomorphic decryption.

Example 27 includes the method of example 19, further including transmitting the data supply chain object to at least one of a blockchain or an object monitoring service to at least one of (a) enforce a contract corresponding to the data, (b) record revisions to the data, (c) enforce data provenance, or (d) track the data.

Example 28 includes an apparatus to generate a data supply chain object, the apparatus including means for, in response to data being generated, generating a local data object and object metadata corresponding to the data, means for hashing the local data object, and hashing a label of the local data object, the generating means to generate a hierarchical data structure for the data including the hash of the local data object and the hash of the label of the local data object, and generate a data supply chain object including the hierarchical data structure, and means for transmitting the data and the data supply chain object to a device that requested access to the data.

Example 29 includes the apparatus of example 28, further including means for encoding the data supply chain object according to a format of the data.

Example 30 includes the apparatus of example 28, further including means for encrypting the data supply chain object using homomorphic encryption.

Example 31 includes the apparatus of example 28, wherein the generating means is to add a tool for transforming the data into the data supply chain object.

Example 32 includes the apparatus of example 28, further including means for applying a data serialization format to the data supply chain object.

Example 33 includes the apparatus of example 28, further including means for linking the data supply chain object to the data.

Example 34 includes the apparatus of example 28, wherein the generating means is to update the data supply chain object to reflect at least one of an access of the data or a transformation of the data.

Example 35 includes the apparatus of example 34, further including means for decrypting the data supply chain object using homomorphic decryption.

Example 36 includes the apparatus of example 28, wherein the transmitting means is to transmit the data supply chain object to at least one of a blockchain or an object monitoring service to at least one of (a) enforce a contract corresponding to the data, (b) record revisions to the data, (c) enforce data provenance, or (d) track the data.

Example 37 includes an apparatus to generate a data supply chain object, the apparatus comprising processor circuitry, and a memory including instructions which, when executed, cause the processor circuitry to in response to data being generated, generate a local data object and object metadata corresponding to the data, hash the local data object, generate a hash of a label of the local data object, generate a hierarchical data structure for the data including the hash of the local data object and the hash of the label of the local data object, generate a data supply chain object including the hierarchical data structure, and transmit the data and the data supply chain object to a device that requested access to the data.

Example 38 includes the apparatus of example 37, wherein the instructions cause the processor circuitry to encode the data supply chain object according to a format of the data.

Example 39 includes the apparatus of example 37, wherein the instructions cause the processor circuitry to encrypt the data supply chain object using homomorphic encryption.

Example 40 includes the apparatus of example 37, wherein the instructions cause the processor circuitry to add a tool for transforming the data into the data supply chain object.

Example 41 includes the apparatus of example 37, wherein the instructions cause the processor circuitry to apply a data serialization format to the data supply chain object.

Example 42 includes the apparatus of example 37, wherein the instructions cause the processor circuitry to link the data supply chain object to the data.

Example 43 includes the apparatus of example 37, wherein the instructions cause the processor circuitry to update the data supply chain object to reflect at least one of an access of the data or a transformation of the data.

Example 44 includes the apparatus of example 43, wherein the instructions cause the processor circuitry to decrypt the data supply chain object using homomorphic decryption.

Example 45 includes the apparatus of example 37, wherein the instructions cause the processor circuitry to transmit the data supply chain object to at least one of a blockchain or an object monitoring service to at least one of (a) enforce a contract corresponding to the data, (b) record revisions to the data, (c) enforce data provenance, or (d) track the data.

Example 46 includes a non-transitory computer readable storage medium comprising data which may be configured into executable instructions and, when configured and executed, cause one or more processors to at least generate a block corresponding to a change of a data supply chain object, include the block corresponding to the change of the data supply chain object in a blockchain tree structure, and track data corresponding to the data supply chain object based on the blockchain tree structure.

Example 47 includes the computer readable storage medium of example 46, wherein the instructions cause the one or more processors to track the data in response to an alert.

Example 48 includes the computer readable storage medium of example 46, wherein the instructions cause the one or more processors to transmit an authentication digest value to a processing device to identify that the data supply chain object has changed.

Example 49 includes the computer readable storage medium of example 46, wherein the instructions cause the one or more processors to use smart contracts to track the data.

Example 50 includes the computer readable storage medium of example 46, wherein the block is a first block, and the instructions cause the one or more processors to recognize a presence of a new data supply chain object using a distributed consensus algorithm, and include a second block for the new data supply chain in the blockchain tree structure.

Example 51 includes a method comprising generating, by executing an instruction with a processor, a block corresponding to a change of a data supply chain object, adding, by executing an instruction with the processor, the block corresponding to the change of the data supply chain object to a blockchain tree structure, and tracking, by executing an instruction with the processor, data corresponding to the data supply chain object based on the blockchain tree structure.

Example 52 includes the method of example 51, further including tracking the data in response to an alert.

Example 53 includes the method of example 51, further including transmitting an authentication digest value to a processing device to identify that the data supply chain object has changed.

Example 54 includes the method of example 51, wherein the tracking is based on smart contracts.

Example 55 includes the method of example 51, wherein the block is a first block, and further including recognizing a presence of a new data supply chain object using a distributed consensus algorithm, and including a second block for the new data supply chain in the blockchain tree structure.

Example 56 includes an apparatus comprising processor circuitry, and a memory including instructions which, when executed, cause the processor circuitry to generate a block corresponding to a change of a data supply chain object, add the block corresponding to the change of the data supply chain object to a blockchain tree structure, and track data corresponding to the data supply chain object based on the blockchain tree structure.

Example 57 includes the apparatus of example 56, wherein the instructions cause the processor circuitry to track the data in response to an alert.

Example 58 includes the apparatus of example 56, wherein the instructions cause the processor circuitry to transmit an authentication digest value to a processing device to identify that the data supply chain object has changed.

Example 59 includes the apparatus of example 56, wherein the instructions cause the processor circuitry to track the data using smart contracts.

Example 60 includes the apparatus of example 56, wherein the block is a first block, and the instructions cause the processor circuitry to recognize a presence of a new data supply chain object using a distributed consensus algorithm, and include a second block for the new data supply chain in the blockchain tree structure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable storage medium comprising data which may be configured into executable instructions and, when configured and executed, cause one or more processors to at least:

in response to data being generated, generate a local data object and object metadata corresponding to the data;

hash the local data object;
generate a hash of a label of the local data object;
generate a hierarchical data structure for the data including the hash of the local data object and the hash of the label of the local data object;
generate a data supply chain object including the hierarchical data structure;
add a tool to the data supply chain object, the tool for transforming the data; and
transmit the data and the data supply chain object to a device that requested access to the data.

2. The computer readable storage medium of claim 1, wherein the instructions cause the one or more processors to encode the data supply chain object according to a format of the data.

3. The computer readable storage medium of claim 1, wherein the instructions cause the one or more processors to encrypt the data supply chain object using homomorphic encryption.

4. The computer readable storage medium of claim 1, wherein the tool is to be accessible from the data supply chain object to transform the data.

5. The computer readable storage medium of claim 1, wherein the instructions cause the one or more processors to apply a data serialization format to the data supply chain object.

6. The computer readable storage medium of claim 1, wherein the instructions cause the one or more processors to link the data supply chain object to the data.

7. The computer readable storage medium of claim 1, wherein the instructions cause the one or more processors to update the data supply chain object to reflect at least one of an access of the data or a transformation of the data.

8. The computer readable storage medium of claim 7, wherein the instructions cause the one or more processors to decrypt the data supply chain object using homomorphic decryption.

9. The computer readable storage medium of claim 1, wherein the instructions cause the one or more processors to transmit the data supply chain object to at least one of a blockchain or an object monitoring service to at least one of (a) enforce a contract corresponding to the data, (b) record of previous revisions to the data, (c) enforce data provenance, or (d) track the data.

10. An apparatus to generate a data supply chain object, the apparatus comprising:
data structure generator circuitry to, in response to data being generated, generate a local data object and object metadata corresponding to the data;
encryptor circuitry to:
hash the local data object; and
generate a hash of a label of the local data object;
the data structure generator circuitry to:
generate a hierarchical data structure for the data including the hash of the local data object and the hash of the label of the local data object;
generate a data supply chain object including the hierarchical data structure; and
add a tool to the data supply chain object, the tool for transforming the data; and
an interface to transmit the data and the data supply chain object to a device that requested access to the data.

11. The apparatus of claim 10, further including encoder circuitry to encode the data supply chain object according to a format of the data.

12. The apparatus of claim 10, wherein the encryptor circuitry is to encrypt the data supply chain object using homomorphic encryption.

13. The apparatus of claim 10, wherein the tool is to be accessible to analyze a history of the data.

14. The apparatus of claim 10, further including encoder circuitry to apply a data serialization format to the data supply chain object.

15. The apparatus of claim 10, further including a file processor to link the data supply chain object to the data.

16. The apparatus of claim 10, wherein the data structure generator circuitry to update the data supply chain object to reflect at least one of an access of the data or a transformation of the data.

17. The apparatus of claim 16, further including decryptor circuitry to decrypt the data supply chain object using homomorphic decryption.

18. The apparatus of claim 10, wherein the interface is to transmit the data supply chain object to at least one of a blockchain or an object monitoring service to at least one of (a) enforce a contract corresponding to the data, (b) record revisions to the data, (c) enforce data provenance, or (d) track the data.

19. An apparatus to generate a data supply chain object, the apparatus including:
means for generating a local data object and object metadata corresponding to data in response to the data being generated;
means for hashing, the means for hashing to:
hash the local data object; and
hash a label of the local data object;
wherein the means for generating is to:
generate a hierarchical data structure for the data including the hash of the local data object and the hash of the label of the local data object;
add a tool to the data supply chain object, the tool for transforming the data; and
generate a data supply chain object including the hierarchical data structure; and
means for transmitting the data and the data supply chain object to a device that requested access to the data.

20. The apparatus of claim 19, further including means for encoding the data supply chain object according to a format of the data.

21. The apparatus of claim 19, further including means for encrypting the data supply chain object using homomorphic encryption.

22. The apparatus of claim 19, wherein the means for generating is to:
determine a type of the data; and
select the tool based on the type of the data.

23. The apparatus of claim 19, further including means for applying a data serialization format to the data supply chain object.

24. An apparatus to generate a data supply chain object, the apparatus comprising:
processor circuitry; and
a memory including instructions which, when executed, cause the processor circuitry to:
in response to data being generated, generate a local data object and object metadata corresponding to the data;
hash the local data object;
generate a hash of a label of the local data object;
generate a hierarchical data structure for the data including the hash of the local data object and the hash of the label of the local data object;

generate a data supply chain object including the hierarchical data structure;

add a tool to the data supply chain object, the tool for transforming the data; and transmit the data and the data supply chain object to a device that requested access to the data.

25. The apparatus of claim 24, wherein the instructions cause the processor circuitry to encode the data supply chain object according to a format of the data.

* * * * *